(12) United States Patent
Yanai et al.

(10) Patent No.: US 8,367,167 B2
(45) Date of Patent: *Feb. 5, 2013

(54) LIQUID CRYSTAL COMPOSITION AND LIQUID CRYSTAL DISPLAY DEVICE

(75) Inventors: Takayoshi Yanai, Ichihara (JP); Norikatsu Hattori, Ichihara (JP)

(73) Assignees: JNC Corporation, Tokyo (JP); JNC Petrochemical Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/313,899

(22) Filed: Dec. 7, 2011

(65) Prior Publication Data

US 2012/0138852 A1 Jun. 7, 2012

(30) Foreign Application Priority Data

Dec. 7, 2010 (JP) ................................ 2010-272716

(51) Int. Cl.
C09K 19/12 (2006.01)
C09K 19/20 (2006.01)
C09K 19/34 (2006.01)
C09K 19/30 (2006.01)

(52) U.S. Cl. ............... 428/1.1; 252/299.61; 252/299.63; 252/299.66; 252/299.67

(58) Field of Classification Search .................. 428/1.1; 252/299.63, 299.66, 299.67, 299.61
See application file for complete search history.

(56) References Cited

U.S. PATENT DOCUMENTS

| 7,976,913 | B2 * | 7/2011 | Hiraoka et al. | 428/1.1 |
| 8,057,866 | B2 * | 11/2011 | Saito | 428/1.1 |
| 8,071,182 | B2 * | 12/2011 | Yanai et al. | 428/1.1 |
| 8,147,929 | B2 * | 4/2012 | Saito | 428/1.1 |
| 8,147,930 | B2 * | 4/2012 | Saito et al. | 428/1.1 |
| 2006/0043334 | A1 | 3/2006 | Tomi | |
| 2008/0099726 | A1 | 5/2008 | Kubo | |
| 2010/0243957 | A1 * | 9/2010 | Saito | 252/299.61 |
| 2010/0272927 | A1 * | 10/2010 | Hiraoka et al. | 428/1.2 |
| 2010/0294991 | A1 * | 11/2010 | Saito et al. | 252/299.61 |
| 2010/0302498 | A1 * | 12/2010 | Saito | 349/186 |
| 2010/0308266 | A1 * | 12/2010 | Yanai et al. | 252/299.61 |
| 2011/0193023 | A1 | 8/2011 | Yanai | |

FOREIGN PATENT DOCUMENTS

WO 2010/090076 A 8/2010

OTHER PUBLICATIONS

English translation of WO 2010/090076.

* cited by examiner

Primary Examiner — Shean C Wu
(74) Attorney, Agent, or Firm — Hogan Lovells US LLP

(57) ABSTRACT

A liquid crystal composition that satisfies at least one characteristic, such as, high maximum temperature of a nematic phase, low minimum temperature of a nematic phase, small viscosity, suitable optical anisotropy, large dielectric anisotropy, large specific resistance, large elastic constant, high stability to ultraviolet light and high stability to heat, or that is suitably balanced between at least two of the characteristics; and provides an AM device that has short response time, large voltage holding ratio, large contrast ratio, long service life and so forth. A liquid crystal composition is provided that has a nematic phase and includes a specific three-ring compound having a large dielectric anisotropy as a first component, a specific four-ring compound having a high maximum temperature and a large dielectric anisotropy as a second component, and a liquid crystal display device containing the composition.

22 Claims, No Drawings

LIQUID CRYSTAL COMPOSITION AND LIQUID CRYSTAL DISPLAY DEVICE

This is a Non-Provisional application, which claims priority to Japanese Patent Application No. 2010-272716, filed on Dec. 7, 2010, the contents of which are all herein incorporated by this reference in their entireties. All publications, patents, patent applications, databases and other references cited in this application, all related applications referenced herein, and all references cited therein, are incorporated by reference in their entirety as if restated here in full and as if each individual publication, patent, patent application, database or other reference were specifically and individually indicated to be incorporated by reference.

BACKGROUND OF THE INVENTION

1. Field of the Invention

The invention relates mainly to a liquid crystal composition suitable for use in an AM (active matrix) device and so forth, and an AM device and so forth that contain the composition. More specifically, the invention relates to a liquid crystal composition having positive dielectric anisotropy, and a device containing the composition and having a mode such as TN (a twisted nematic) mode, an OCB (optically compensated bend) mode, an IPS (in-plane switching) mode, a FFS (fringe field switching) mode or a PSA (polymer sustained alignment) mode.

2. Related Art

In a liquid crystal display device, a classification based on an operating mode for liquid crystals includes modes of PC (a phase change), TN (twisted nematic), STN (super twisted nematic), ECB (electrically controlled birefringence), OCB (optically compensated bend), IPS (in-plane switching), VA (vertical alignment), FFS (fringe field switching) and PSA (polymer sustained alignment). A classification based on a driving mode in the device includes PM (a passive matrix) and AM (an active matrix). The PM is further classified into static, multiplex and so forth, and the AM is classified into TFT (a thin film transistor), MIM (a metal-insulator-metal) and so forth. The TFT is further classified into amorphous silicon and polycrystal silicon. The latter is classified into a high temperature type and a low temperature type according to the production process. A classification based on a light source includes a reflection type utilizing natural light, a transmission type utilizing a backlight and a semi-transmission type utilizing both natural light and a backlight.

These devices contain a liquid crystal composition having suitable characteristics. The liquid crystal composition has a nematic phase. General characteristics of the composition should be improved to give an AM device having good general characteristics. Table 1 below summarizes the relationship between the general characteristics of the two. The general characteristics of the composition will be explained further based on a commercially available AM device. The temperature range of a nematic phase relates to the temperature range in which the device can be used. A desirable maximum temperature of the nematic phase is approximately 70° C. or higher and a desirable minimum temperature of the nematic phase is approximately −10° C. or lower. The viscosity of the composition relates to the response time of the device. A short response time is desirable for displaying moving images on the device. Accordingly, a small viscosity of the composition is desirable. A small viscosity at a low temperature is more desirable. The elastic constant of the composition relates to the contrast of the device. A large elastic constant of the composition is desirable for increasing the contrast of the device.

TABLE 1

General Characteristics of Composition and AM Device

| No. | General Characteristics of Composition | General Characteristics of AM Device |
|---|---|---|
| 1 | wide temperature range of a nematic phase | wide usable temperature range |
| 2 | small viscosity [1] | short response time |
| 3 | suitable optical anisotropy | large contrast ratio |
| 4 | large positive or negative dielectric anisotropy | low threshold voltage and small electric power consumption large contrast ratio |
| 5 | large specific resistance | large voltage holding ratio and large contrast ratio |
| 6 | high stability to ultraviolet light and heat | long service life |
| 7 | large elastic constant | short response time and large contrast ratio |

[1] A liquid crystal composition can be injected into a liquid crystal cell in a shorter period of time.

The optical anisotropy of the composition relates to the contrast ratio of the device. The product (Δn×d) of the optical anisotropy (Δn) of the composition and the cell gap (d) of the device is designed so as to maximize the contrast ratio. A suitable value of the product depends on the kind of operating mode. In a device having a TN mode, a suitable value is approximately 0.45 micrometer. In this case, a composition having a large optical anisotropy is desirable for a device having a small cell gap. A large dielectric anisotropy of the composition contributes to a low threshold voltage, small electric power consumption and a large contrast ratio of the device. Accordingly, a large dielectric anisotropy is desirable. A large specific resistance of the composition contributes to a large voltage holding ratio and a large contrast ratio of the device. Accordingly, a composition having a large specific resistance is desirable at room temperature and also at a temperature close to the maximum temperature of a nematic phase in the initial stage. A composition having a large specific resistance is desirable at room temperature and also at a temperature close to the maximum temperature of a nematic phase after it has been used for a long time. The stability of the composition to ultraviolet light and heat relates to the service life of the liquid crystal display device. In the case where the stability is high, the device has a long service life. These characteristics are desirable for an AM device used in a liquid crystal projector, a liquid crystal television and so forth. A large elastic constant of the composition contributes to a large contrast ratio and a short response time of the device. Accordingly, a large elastic constant is desirable.

A composition having positive dielectric anisotropy is used for an AM device having a TN mode. On the other hand, a composition having negative dielectric anisotropy is used for an AM device having a VA mode. A composition having positive or negative dielectric anisotropy is used for an AM device having an IPS mode or a FFS mode. A composition having positive or negative dielectric anisotropy is used for an AM device having a PSA mode. Examples of liquid crystal compositions having positive dielectric anisotropy are disclosed in the following patent documents 1 to 4.

Patent document No. 1: JP 2006-089703 A.
Patent document No. 2: JP 2008-133470 A.
Patent document No. 3: WO 2010/050324 A.
Patent document No. 4: WO 2010/090076 A.

A desirable AM device has characteristics such as a wide temperature range in which the device can be used, a short response time, a large contrast ratio, a low threshold voltage, a large voltage holding ratio and a long service life. Response time that is even one millisecond shorter than that of the other devices is desirable. Thus, a composition having characteristics such as a high maximum temperature of a nematic phase, a low minimum temperature of a nematic phase, a small viscosity, a suitable optical anisotropy, a large dielectric anisotropy, a large specific resistance, a high stability to ultraviolet light, a high stability to heat and a large elastic constant is desirable.

SUMMARY OF THE INVENTION

The invention concerns a liquid crystal composition having a nematic phase, wherein a first component is at least one compound selected from the group of compounds represented by formula (1), a second component is at least one compound selected from the group of compounds represented by formula (2), and also concerns a liquid crystal display device containing the composition:

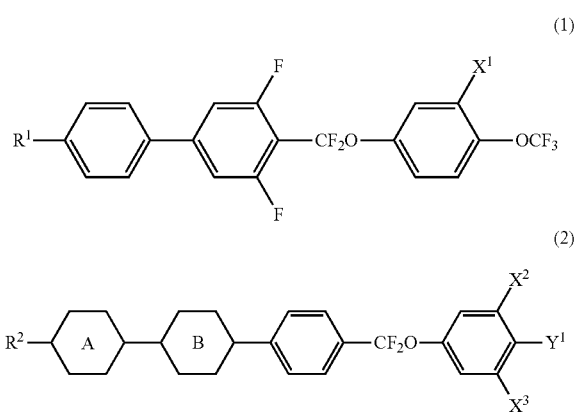

wherein $R^1$ and $R^2$ are each independently alkyl having 1 to 12 carbons, alkoxy having 1 to 12 carbons, alkenyl having 2 to 12 carbons or alkenyl having 2 to 12 carbons in which arbitrary hydrogen is replaced by fluorine; ring A and ring B are each independently 1,4-cyclohexylene, or 1,4-phenylene; $X^1$, $X^2$ and $X^3$ are each independently hydrogen or fluorine; $Y^1$ is fluorine, chlorine or trifluoromethoxy.

DETAILED DESCRIPTION OF THE INVENTION

Usage of the terms in the specification and claims is as follows. The liquid crystal composition of the invention and the liquid crystal display device of the invention may be abbreviated to "the composition" and "the device," respectively. "A liquid crystal display device" is a generic term for a liquid crystal display panel and a liquid crystal display module. "A liquid crystal compound" is a generic term for a compound having a liquid crystal phase such as a nematic phase or a smectic phase, and also for a compound having no liquid crystal phases but being useful as a component of a composition. Such a compound has a six-membered ring such as 1,4-cyclohexylene and 1,4-phenylene, and a rod-like molecular structure. An optically active compound and a polymerizable compound may occasionally be added to the composition. Even in the case where these compounds are liquid crystalline, the compounds are classified as an additive herein. At least one compound selected from the group of compounds represented by formula (1) may be abbreviated to "the compound (1)." "The compound (1)" means one compound, or two or more compounds represented by formula (1). The same rules apply to compounds represented by the other formulas. "Arbitrary" is used not only in cases where the position is arbitrary but also in cases where the number is arbitrary. However, it is not used in cases where the number is 0 (zero).

A higher limit of the temperature range of a nematic phase may be abbreviated to "the maximum temperature." A lower limit of the temperature range of a nematic phase may be abbreviated to "the minimum temperature." That "specific resistance is large" means that a composition has a large specific resistance at room temperature and also at a temperature close to the maximum temperature of a nematic phase in the initial stage, and that the composition has a large specific resistance at room temperature and also at a temperature close to the maximum temperature of a nematic phase even after it has been used for a long time. That "a voltage holding ratio is large" means that a device has a large voltage holding ratio at room temperature and also at a temperature close to the maximum temperature of a nematic phase in the initial stage, and that the device has a large voltage holding ratio at room temperature and also at a temperature close to the maximum temperature of a nematic phase even after it has been used for a long time. When characteristics such as optical anisotropy are explained, values which are obtained according to the measuring methods described in Examples will be used. A first component means one compound, or two or more compounds. "The ratio of the first component" is expressed as a percentage by weight (% by weight) of the first component based on the total weight of the liquid crystal composition. The same rule applies to the ratio of a second component and so forth. The ratio of an additive mixed with the composition is expressed as a percentage by weight (% by weight) or weight parts per million (ppm) based on the total weight of the liquid crystal composition.

The symbol $R^1$ is used for a plurality of compounds in the chemical formulas of component compounds. Two groups represented by R1 may be the same or different in arbitrary two of these compounds. In one case, for example, $R^1$ of the compound (1) is ethyl and $R^1$ of the compound (1-1) is ethyl. In another case, $R^1$ of the compound (1) is ethyl and $R^1$ of the compound (1-1) is propyl. The same rule applies to the symbols $R^2$ and $R^3$ and so forth.

One of the advantages of the invention is to provide a liquid crystal composition that satisfies at least one of characteristics such as a high maximum temperature of a nematic phase, a low minimum temperature of a nematic phase, a small viscosity, a suitable optical anisotropy, a large dielectric anisotropy, a large specific resistance, a high stability to ultraviolet light, a high stability to heat and a large elastic constant. Another advantage is to provide a liquid crystal composition that is suitably balanced between at least two of the characteristics. A further advantage is to provide a liquid crystal display device that contains such a composition. An additional advantage is to provide a composition that has a suitable optical anisotropy, a large dielectric anisotropy, a high stability to ultraviolet light, a large elastic constant and so forth, and is to provide an AM device that has a short response time, a large voltage holding ratio, a large contrast ratio, a long service life and so forth.

The liquid crystal composition of the invention satisfied at least one of characteristics such as a high maximum temperature of a nematic phase, a low minimum temperature of a nematic phase, a small viscosity, a suitable optical anisotropy, a large dielectric anisotropy, a large specific resistance, a high stability to ultraviolet light, a high stability to heat and a large elastic constant. The liquid crystal composition was suitably balanced between at least two of the characteristics. The liquid crystal display device contained such a composition. The composition had a suitable optical anisotropy, a large dielectric anisotropy, a high stability to ultraviolet light, a large elastic constant and so forth, and the AM device had a short response time, a large voltage holding ratio, a large contrast ratio, a long service life and so forth.

The invention includes the following items.

1. A liquid crystal composition having a nematic phase and comprising three components, wherein a first component is at least one compound selected from the group of compounds represented by formula (1), and a second component is at least one compound selected from the group of compounds represented by formula (2):

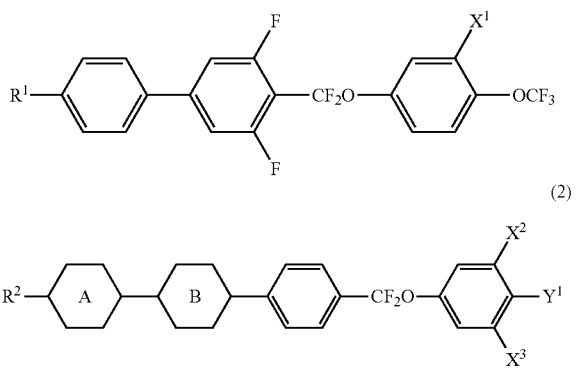

wherein $R^1$ and $R^2$ are each independently alkyl having 1 to 12 carbons, alkoxy having 1 to 12 carbons, alkenyl having 2 to 12 carbons or alkenyl having 2 to 12 carbons in which arbitrary hydrogen is replaced by fluorine; ring A and ring B are each independently 1,4-cyclohexylene or 1,4-phenylene, $X^1$, $X^2$ and $X^3$ are each independently hydrogen or fluorine; $Y^1$ is fluorine, chlorine or trifluoromethoxy.

2. The liquid crystal composition according to item 1, wherein the first component is at least one compound selected from the group of compounds represented by formula (1-1) and formula (1-2):

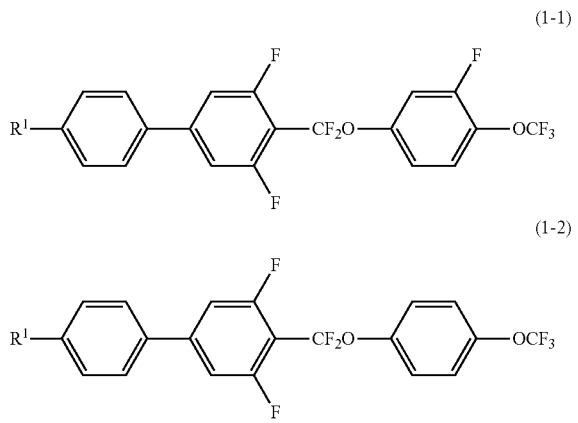

wherein $R^1$ is independently alkyl having 1 to 12 carbons, alkoxy having 1 to 12 carbons or alkenyl having 2 to 12 carbons.

3. The liquid crystal composition according to item 2, wherein the first component is at least one compound selected from the group of compounds represented by formula (1-1).

4. The liquid crystal composition according to any one of items 1 to 3, wherein the second component is at least one compound selected from the group of compounds represented by formula (2-1) and formula (2-2):

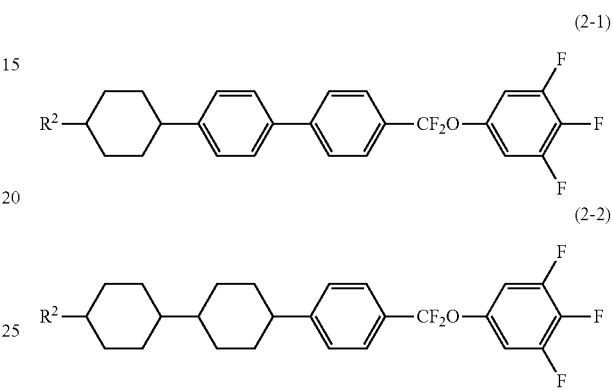

wherein $R^2$ is independently alkyl having 1 to 12 carbons, alkoxy having 1 to 12 carbons or alkenyl having 2 to 12 carbons.

5. The liquid crystal composition according to item 4, wherein the second component is at least one compound selected from the group of compounds represented by formula (2-1).

6. The liquid crystal composition according to any one of items 1 to 5, wherein the ratio of the first component is in the range of approximately 5% by weight to approximately 50% by weight, the ratio of the second component is in the range of approximately 5% by weight to approximately 50% by weight, based on the total weight of the liquid crystal composition.

7. The liquid crystal composition according to any one of items 1 to 6, further comprising at least one compound selected from the group of compounds represented by formula (3) as a third component:

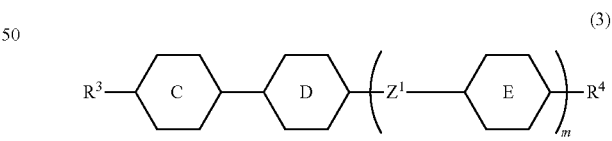

wherein $R^3$ and $R^4$ are each independently alkyl having 1 to 12 carbons, alkoxy having 1 to 12 carbons, alkenyl having 2 to 12 carbons or alkenyl having 2 to 12 carbons in which arbitrary hydrogen is replaced by fluorine; ring C, ring D and ring E are each independently 1,4-cyclohexylene, 1,4-phenylene, 2-fluoro-1,4-phenylene, 3-fluoro-1,4-phenylene or 2,5-difluoro-1,4-phenylene; $Z^1$ is independently a single bond, ethylene or carbonyloxy; and m is 0, 1 or 2.

8. The liquid crystal composition according to item 7, wherein the third component is at least one compound selected from the group of compounds represented by formula (3-1) to formula (3-13):

(3-1) 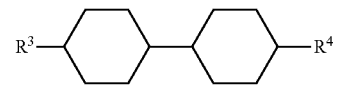

(3-2) 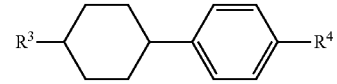

(3-3) 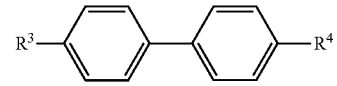

(3-4) 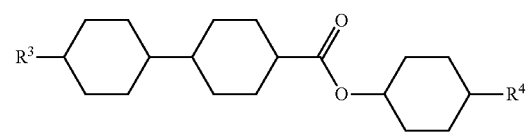

(3-5) 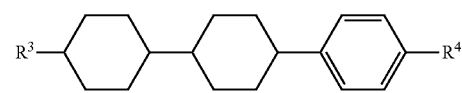

(3-6) 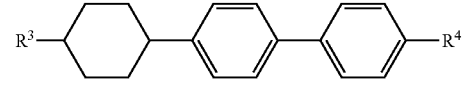

(3-7) 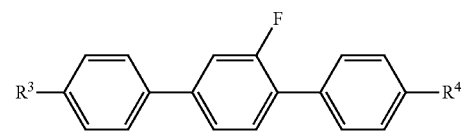

(3-8) 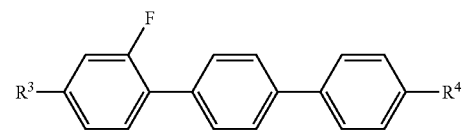

(3-9) 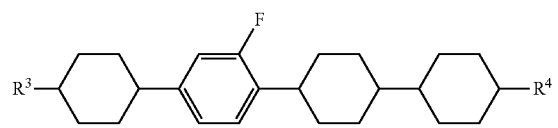

(3-10) 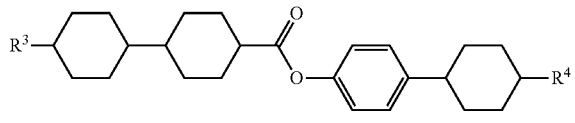

(3-11) 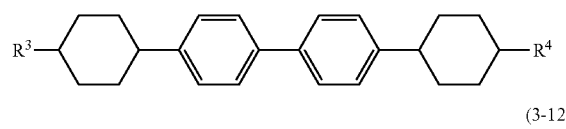

(3-12) 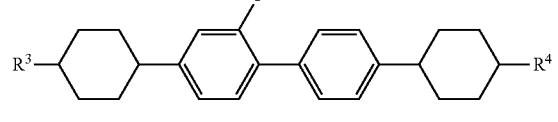

-continued (3-13) 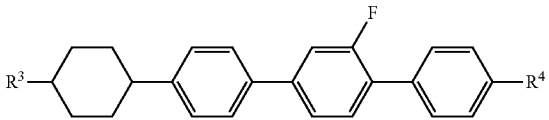

wherein $R^3$ and $R^4$ are each independently alkyl having 1 to 12 carbons, alkoxy having 1 to 12 carbons, alkoxymethyl having 2 to 12 carbons, alkenyl having 2 to 12 carbons, or alkenyl having 2 to 12 carbons in which arbitrary hydrogen is replaced by fluorine.

9. The liquid crystal composition according to item 8, wherein the third component is at least one compound selected from the group of compounds represented by formula (3-1).

10. The liquid crystal composition according to item 8, wherein the third component is at least one compound selected from the group of compounds represented by formula (3-7).

11. The liquid crystal composition according to item 8, wherein the third component is at least one compound selected from the group of compounds represented by formula (3-1) and formula (3-10).

12. The liquid crystal composition according to item 8, wherein the third component is a mixture of at least one compound selected from the group of compounds represented by formula (3-1), at least one compound selected from the group of compounds represented by formula (3-7), and at least one compound selected from the group of compounds represented by formula (3-10).

13. The liquid crystal composition according to any one of items 7 to 12 wherein the ratio of the third component is in the range of approximately 30% by weight to approximately 75% by weight based on the total weight of the liquid crystal composition.

14. The liquid crystal composition according to any one of items 1 to 13, further comprising at least one compound selected from the group of compounds represented by formula (4) as a fourth component:

(4) 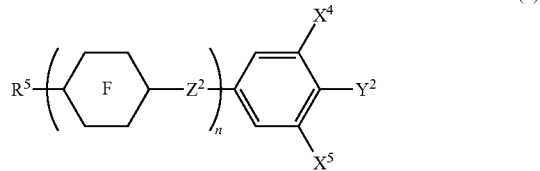

wherein $R^5$ is alkyl having 1 to 12 carbons, alkoxy having 1 to 12 carbons or alkenyl having 2 to 12 carbons; ring F is independently 1,4-cyclohexylene, 1,4-phenylene, 2-fluoro-1,4-phenylene, 3-fluoro-1,4-phenylene, 3,5-difluoro-1,4-phenylene, 1,3-dioxane-2,5-diyl or tetrahydropyran-2,5-diyl or pyrimidine-2,5-diyl; $X^4$ and $X^5$ are each independently hydrogen or fluorine; $Y^2$ is fluorine or chlorine; and $Z^2$ is independently a single bond, ethylene, carbonyloxy or difluoromethyleneoxy; n is 1, 2 or 3; and three of $Z^2$ are all single bonds when n is 3.

15. The liquid crystal composition according to item 14, wherein the fourth component is at least one compound selected from the group of compounds represented by formula (4-1) to formula (4-19):

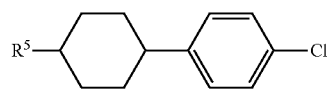 (4-1)
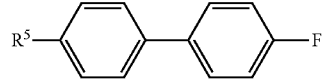 (4-2)
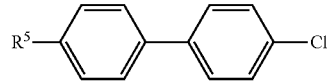 (4-3)
 (4-4)
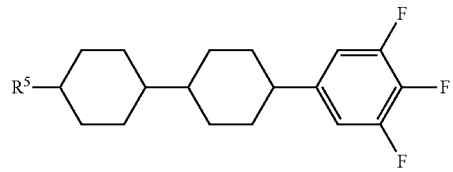 (4-5)
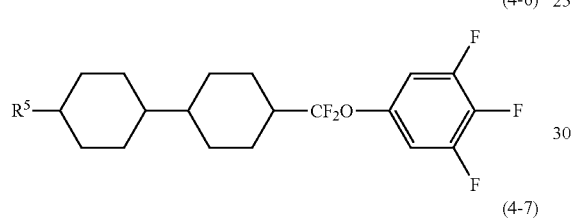 (4-6)
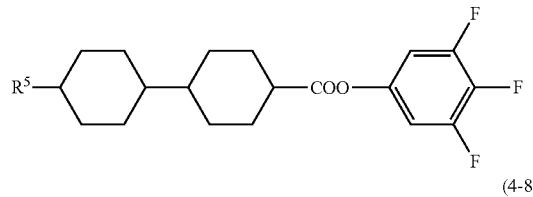 (4-7)
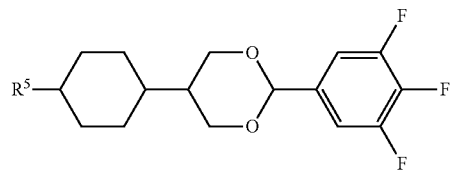 (4-8)
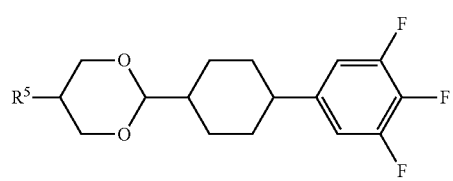 (4-9)
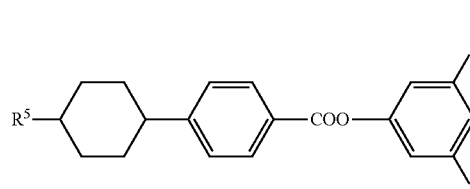 (4-10)
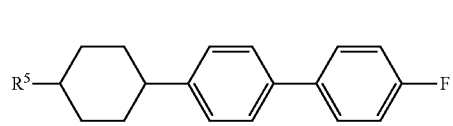 (4-11)
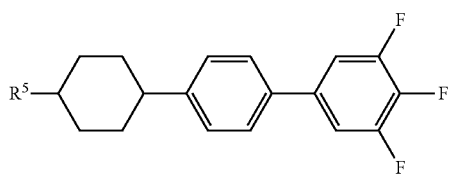 (4-12)
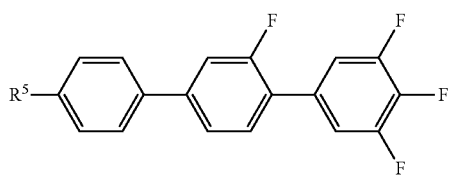 (4-13)
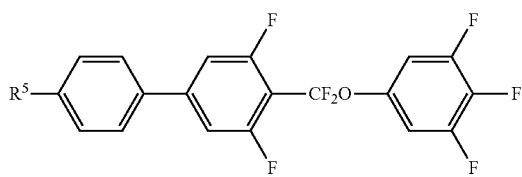 (4-14)
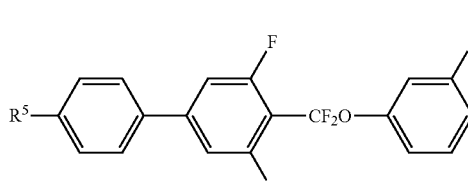 (4-15)
(4-16)
(4-17)
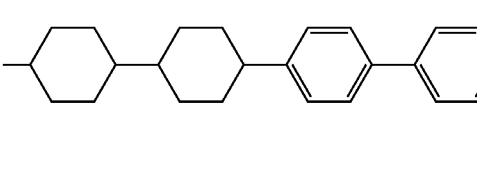 (4-18)
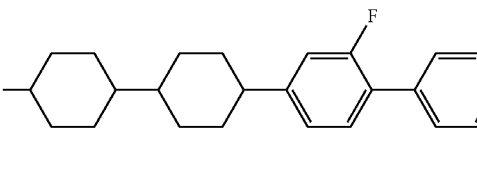 (4-19)
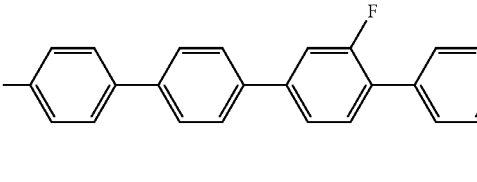
wherein $R^5$ is alkyl having 1 to 12 carbons, alkoxy having 1 to 12 carbons or alkenyl having 2 to 12 carbons.

16. The liquid crystal composition according to item 15, wherein the fourth component is at least one compound selected from the group of compounds represented by formula (4-13).

17. The liquid crystal composition according to item 15, wherein the fourth component is at least one compound selected from the group of compounds represented by formula (4-14).

18. The liquid crystal composition according to any one of items 14 to 17, wherein the ratio of the fourth component is in the range of approximately 3% by weight to approximately 40% by weight based on the total weight of the liquid crystal composition.

19. The liquid crystal composition according to any one of items 1 to 18, further including at least one compound selected from the group of compounds represented by formula (5) as a fifth component:

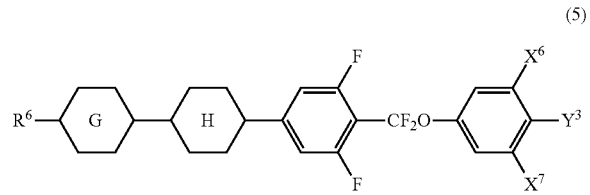

(5)

wherein $R^6$ is alkyl having 1 to 12 carbons, alkoxy having 1 to 12 carbons or alkenyl having 2 to 12 carbons; ring G and ring H are each independently 1,4-cyclohexylene, 1,4-phenylene, 2-fluoro-1,4-phenylene, 3-fluoro-1,4-phenylene, or 3,5-difluoro-1,4-phenylene; $X^6$ and $X^7$ are each independently hydrogen or fluorine; $Y^3$ is fluorine, chlorine or trifluoromethoxy.

20. The liquid crystal composition according to item 19, wherein the fifth component is at least one compound selected from the group of compounds represented by formula (5-1) to formula (5-5):

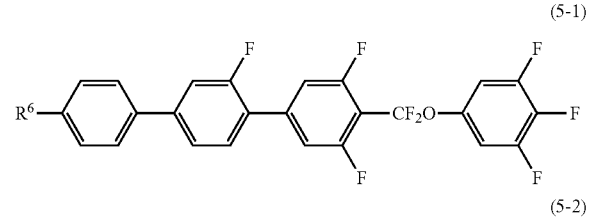

(5-1)

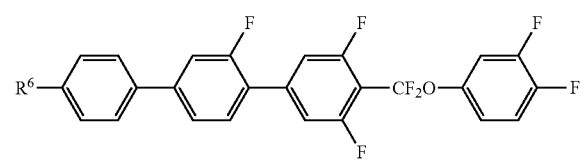

(5-2)

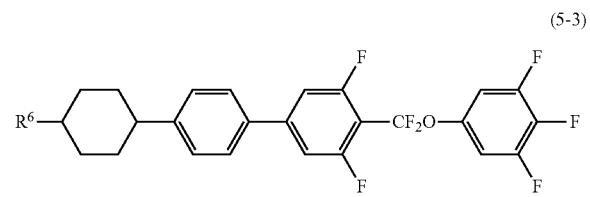

(5-3)

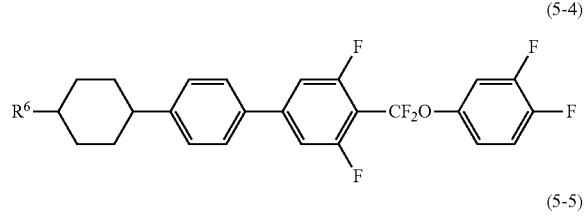

(5-4)

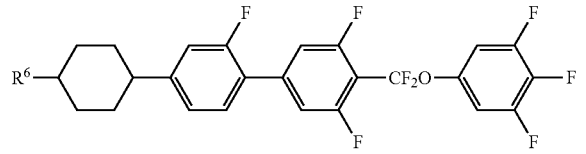

(5-5)

wherein $R^6$ is alkyl having 1 to 12 carbons, alkoxy having 1 to 12 carbons or alkenyl having 2 to 12 carbons.

21. The liquid crystal composition according to item 20, wherein the fifth component is at least one compound selected from the group of compounds represented by formula (5-1).

22. The liquid crystal composition according to item 19 to 21, wherein the ratio of the fifth component is in the range of approximately 3% by weight to approximately 20% by weight based on the total weight of the liquid crystal composition.

23. The liquid crystal composition according to any one of items 1 to 22, wherein the maximum temperature of a nematic phase is approximately 70° C. or higher, the optical anisotropy (25° C.) at a wavelength of 589 nanometers is approximately 0.08 or more, and the dielectric anisotropy (25° C.) at a frequency of 1 kHz is approximately 4 or more.

24. A liquid crystal display device containing the liquid crystal composition according to any one of items 1 to 23.

25. The liquid crystal display device according to item 24, wherein an operating mode of the liquid crystal display device is a TN mode, an OCB mode, an IPS mode, a FFS mode or a PSA mode, and a driving mode of the liquid crystal display device is an active matrix mode.

26. Use of the liquid crystal composition in the liquid crystal display device according to any one of items 1 to 23.

The invention further includes the following items: (1) the composition described above, further including an optically active compound; (2) the composition described above, further including an additive, such as an antioxidant, an ultraviolet light absorber, an antifoaming agent, a polymerizable compound and/or a polymerization initiator; (3) an AM device containing the composition described above; (4) a device having a mode of TN, ECB, OCB, IPS, FFS or PSA and containing the composition described above; (5) a transmission-type device containing the composition described above; (6) use of the composition described above as a composition having a nematic phase; and (7) use of the composition prepared by the addition of an optically active compound to the composition described above, as an optically active composition.

The composition of the invention will be explained in the following order. First, the constitution of component compounds in the composition will be explained. Second, main characteristics of the component compounds and main effects of these compounds on the composition will be explained. Third, a combination of components in the composition, desirable ratios of the component and the basis thereof will be explained. Fourth, a desirable embodiment of the component compounds will be explained. Fifth, specific examples of the component compounds will be shown. Sixth, additives that may be mixed with the composition will be explained. Seventh, methods for synthesizing the component compounds will be explained. Last, use of the composition will be explained.

First, the constitution of component compounds in the composition will be explained. The compositions of the invention are classified into the composition A and the composition B. The composition A may further include any other liquid crystal compound, an additive and an impurity in addition to a compound selected from the compound (1), the compound (2), the compound (3), the compound (4) and the compound (5). "Any other liquid crystal compound" is a liquid crystal compound that is different from the compound (1), the compound (2), the compound (3), the compound (4) and the compound (5). Such a compound is mixed with the composition for the purpose of further adjusting characteristics of the composition. The additive includes an optically active compound, an antioxidant, an ultraviolet light absorber, a coloring matter, an antifoaming agent, a polymerizable compound and a polymerization initiator. The impurity is compounds and so forth which have contaminated component compounds in a process such as their synthesis. Even in the case where the compound is liquid crystalline, it is classified into the impurity herein.

The composition B consists essentially of compounds selected from the group of the compound (1), the compound (2), the compound (3), the compound (4) and the compound (5). The term "essentially" means that the composition may also include an additive and an impurity, but does not include any liquid crystal compound other than these compounds. The composition B has a smaller number of components than the composition A. The composition B is preferable to the composition A in view of cost reduction. The composition A is preferable to the composition B in view of the fact that physical properties can be further adjusted by adding any other liquid crystal compound.

Second, main characteristics of the component compounds and main effects of the compounds on the characteristics of the composition will be explained. The main characteristics of the component compounds are summarized in Table 2 on the basis of the effects of the invention. In Table 2, the symbol L stands for "large" or "high", the symbol M stands for "medium", and the symbol S stands for "small" or "low." The symbols L, M and S are classified according to a qualitative comparison among the component compounds, and 0 (zero) means that "a value is nearly zero."

TABLE 2

Characteristics of compounds

| Compounds | Compound (1) | Compound (2) | Compound (3) | Compound (4) | Compound (5) |
|---|---|---|---|---|---|
| Maximum Temperature | S | L | S-L | S-L | M |
| Viscosity | M | L | S-L | M-L | L |
| Optical Anisotropy | L | M-L | S-L | M-L | M-L |
| Dielectric Anisotropy | L | M-L | 0 | M-L | L |
| Specific Resistance | L | L | L | L | L |

Main effects of the component compounds on the characteristics of the composition upon mixing the component compounds with the composition are as follows. The compound (1) significantly increases the dielectric anisotropy. The compound (2) increases the maximum temperature, and increases the dielectric anisotropy. The compound (3) decreases the minimum temperature, and decreases the viscosity. The compound (4) decreases the minimum temperature and increases the dielectric anisotropy. The compound (5) increases the dielectric anisotropy.

Third, a combination of the components in the composition, desirable ratios of the component compounds and the basis thereof will be explained. A combination of the components in the composition is the first and second components, the first, second and third components, the first, second and fourth components, the first, second and fifth components, the first, second, third and fourth components, the first, second, third and fifth components, the first, second, fourth and fifth components, and the first, second, third, fourth and fifth components. A desirable combination of the components in the composition is the first, second, third and fourth components and the first, second, third, fourth and fifth components.

A desirable ratio of the first component is approximately 5% by weight or more for increasing the dielectric anisotropy, and approximately 50% by weight or less for decreasing the minimum temperature. A more desirable ratio is in the range of approximately 7% by weight to approximately 35% by weight. An especially desirable ratio is in the range of approximately 10% by weight to approximately 20% by weight.

A desirable ratio of the second component is approximately 5% by weight or more for increasing the dielectric anisotropy, and approximately 50% by weight or less for decreasing the minimum temperature. A more desirable ratio is in the range of approximately 5% by weight to approximately 35% by weight. An especially desirable ratio is in the range of approximately 5% by weight to approximately 20% by weight.

A desirable ratio of the third component is approximately 30% by weight or more for decreasing the viscosity, and approximately 75% by weight or less for increasing the dielectric anisotropy. A more desirable ratio is in the range of approximately 40% by weight to approximately 70% by weight. An especially desirable ratio is in the range of approximately 50% by weight to approximately 65% by weight.

A desirable ratio of the fourth component is approximately 3% by weight or more for increasing the dielectric anisotropy, and approximately 40% by weight or less for decreasing the minimum temperature. A more desirable ratio is in the range of approximately 5% by weight to approximately 35% by weight. An especially desirable ratio is in the range of approximately 10% by weight to approximately 30% by weight.

The fifth component is suitable to prepare a composition having a high maximum temperature and a large dielectric anisotropy. A desirable ratio of the fifth component is in the range of approximately 3% by weight to approximately 20% by weight. A more desirable ratio is in the range of approximately 3% by weight to approximately 15% by weight. An especially desirable ratio is in the range of approximately 3% by weight to approximately 10% by weight.

Fourth, a desirable embodiment of the component compounds will be explained. $R^1$, $R^2$, $R^5$ and $R^6$ are each independently alkyl having 1 to 12 carbons, alkoxy having 1 to 12 carbons or alkenyl having 2 to 12 carbons. Desirable $R^1$, $R^2$, $R^5$ or $R^6$ is alkyl having 1 to 12 carbons for increasing the stability to ultraviolet light or for increasing the stability to heat. $R^3$ and $R^4$ are each independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine. Desirable $R^3$ or $R^4$ is alkenyl having 2 to 5 carbons for decreasing the viscosity, and alkyl having 1 to 7 carbons for increasing the stability to ultraviolet light or for increasing the stability to heat.

Desirable alkyl is methyl, ethyl, propyl, butyl, pentyl, hexyl, heptyl or octyl. More desirable alkyl is ethyl, propyl, butyl, pentyl or heptyl for decreasing the viscosity.

Desirable alkoxy is methoxy, ethoxy, propoxy, butoxy, pentyloxy, hexyloxy or heptyloxy. More desirable alkoxy is methoxy or ethoxy for decreasing the viscosity.

Desirable alkenyl is vinyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl or 5-hexenyl. More desirable alkenyl is vinyl, 1-propenyl, 3-butenyl or 3-pentenyl for decreasing the viscosity. A desirable configuration of —CH=CH— in the alkenyl depends on the position of the double bond. Trans is preferable in the alkenyl such as 1-propenyl, 1-butenyl, 1-pentenyl, 1-hexenyl, 3-pentenyl and 3-hexenyl for decreasing the viscosity. Cis is preferable in the alkenyl such as 2-butenyl, 2-pentenyl and 2-hexenyl. In the alkenyl, straight-chain alkenyl is preferable to branched-chain alkenyl.

Desirable examples of alkenyl in which arbitrary hydrogen is replaced by fluorine are 2,2-difluorovinyl, 3,3-difluoro-2-propenyl, 4,4-difluoro-3-butenyl, 5,5-difluoro-4-pentenyl and 6,6-difluoro-5-hexenyl. More desirable examples are 2,2-difluorovinyl and 4,4-difluoro-3-butenyl for decreasing the viscosity.

The alkyl does not include cycloalkyl. The alkoxy does not include cycloalkoxy. The alkenyl does not include cycloalkenyl. That the alkenyl in which arbitrary hydrogen is replaced by fluorine does not include cycloalkenyl in which arbitrary hydrogen is replaced by fluorine. Regarding the configuration of 1,4-cycrohexylene, trans is preferable to cis for increasing the maximum temperature.

Ring A and ring B are each independently 1,4-cyclohexylene, or 1,4-phenylene. Desirable ring A is 1,4-cycrohexylene for decreasing the viscosity, and desirable ring B is 1,4-phenylene for increasing the optical anisotropy. Ring C, ring D and ring E are each independently 1,4-cyclohexylene, 1,4-phenylene, 2-fluoro-1,4-phenylene, 3-fluoro-1,4-phenylene, or 2,5-difluoro-1,4-phenylene. Two rings E may be the same or different when m is 2. Desirable ring C, ring D or ring E are 1,4-phenylene or 3-fluoro-1,4-phenylene for increasing the optical anisotropy, and 1,4-cyclohexylene for decreasing the viscosity. Ring F is 1,4-cycrohexylene, 1,4-phenylene, 2-fluoro-1,4phenylene, 3,5-difluoro-1,4-phenylene, 1,3-dioxane-2,5-diyl, tetrahydropyran-2,5-diyl or 2,5-pyrimidine-2,5-diyl, two rings F may be same or different when n is 2 or 3. Desirable ring F is 1,4-cycrohexylene for increasing the maximum temperature, and 1,4-phenylene for increasing the optical anisotropy. Rings G and H are each independently 1,4-cycrohexylene, 1,4-phenylene, 2-fluoro-1,4phenylene, 3-fluoro-1,4-phenylene or 3,5-difluoro-1,4-phenylene. Desirable ring G or H is 1,4phenylene, or 3-fluoro-1,4-phenylene for increasing the optical anisotropy.

$Z^1$ is a single bond, ethylene or carbonyloxy, and two of $Z^1$ may be the same or different when m is 2. Desirable $Z^1$ is a single bond for decreasing the viscosity, and carbonyloxy for increasing the maximum temperature. $Z^2$ is a single bond, ethylene, carbonyloxy or difluoromethyleneoxy, and two of $Z^2$ may be the same or different when n is 2. Three of $Z^2$ are all single bonds. Desirable $Z^2$ is a single bond for decreasing the viscosity, and difluoromethyleneoxy for increasing the dielectric anisotropy.

$X^1$, $X^2$, $X^3$, $X^4$, $X^5$, $X^6$ and $X^7$ are each independently hydrogen or fluorine. Desirable $X^1$, $X^2$, $X^3$, $X^4$, $X^5$, $X^6$ or $X^7$ is fluorine for increasing the dielectric anisotropy.

$Y^1$ and $Y^3$ are independently fluorine, chlorine or trifluoromethoxy. Desirable $Y^1$ or $Y^3$ is fluorine for decreasing the viscosity. $Y^2$ is independently fluorine or chlorine. Desirable $Y^2$ is fluorine for decreasing the viscosity.

m is 0, 1 or 2. Desirable m is 0 for decreasing the viscosity, and 2 for increasing the maximum temperature. n is 1, 2 or 3. Desirable n is 2 for increasing the maximum temperature and 3 for increasing the stability to ultraviolet light or heat.

Fifth, specific examples of the component compounds will be shown. In the desirable compounds described below, $R^7$, $R^8$, $R^{12}$ and $R^{13}$ are each independently straight chained alkyl having 1 to 12 carbons. $R^9$ is independently alkyl having 1 to 12 carbons or alkoxy having 1 to 12 carbons. $R^{10}$ and $R^{11}$ are each independently straight chained alkyl having 1 to 12 carbons or straight chained alkenyl having 2 to 12 carbons.

Desirable compound (1) are the compounds (1-1-1) and (1-2-1). More desirable compound (1) is the compounds (1-1-1). Desirable compound (2) are the compound (2-1-1) and the compound (2-2-1). More desirable compound (2) is the compound (2-1-1). Desirable compound (3) are the compound (3-1-1) to the compound (3-13-1). More desirable compound (3) are the compound (3-1-1), the compound (3-5-1), the compound (3-7-1), the compound (3-10-1) and the compound (3-13-1). Especially desirable compound (3) is the compound (3-1-1). Desirable compound (4) are the compound (4-1-1) to the compound (4-19-1). More desirable compound (4) are the compound (4-5-1), the compound (4-6-1), the compound (4-13-1), the compound (4-14-1), the compound (4-16-1), the compound (4-18-1) and the compound (4-19-1). Especially desirable compound (4) are the compound (4-13-1), the compound (4-14-1), the compound (4-18-1) and the compound (4-19-1). Desirable compound (5) are the compound (5-1-1) to the compound (5-5-1). More desirable compound (5) are the compound (5-1-1), the compound (5-3-1) and the compound (5-5-1). Especially desirable compound (5) is the compound (5-1-1).

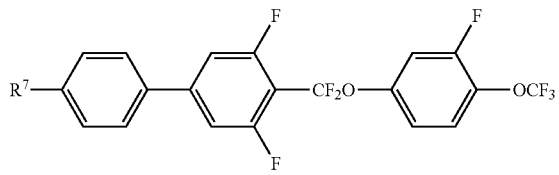

(1-1-1)

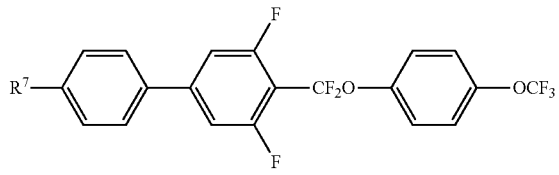

(1-2-1)

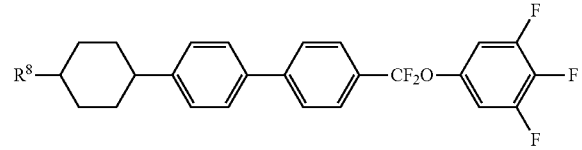

(2-1-1)

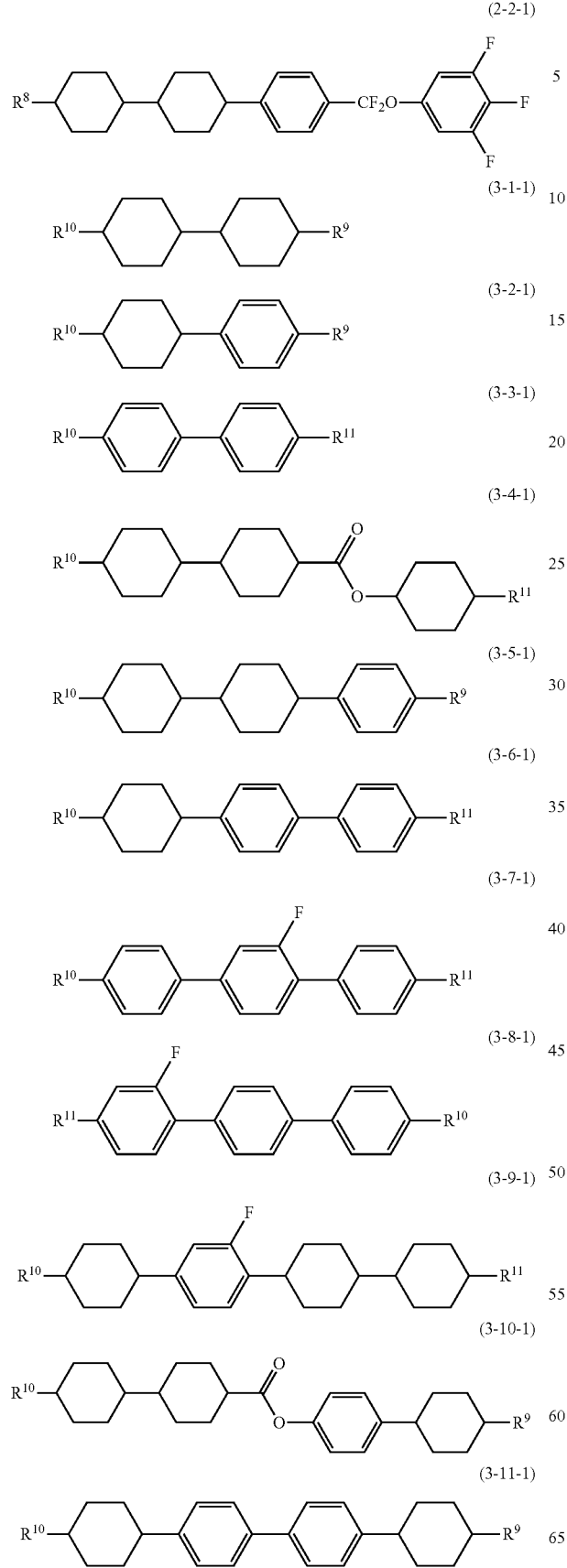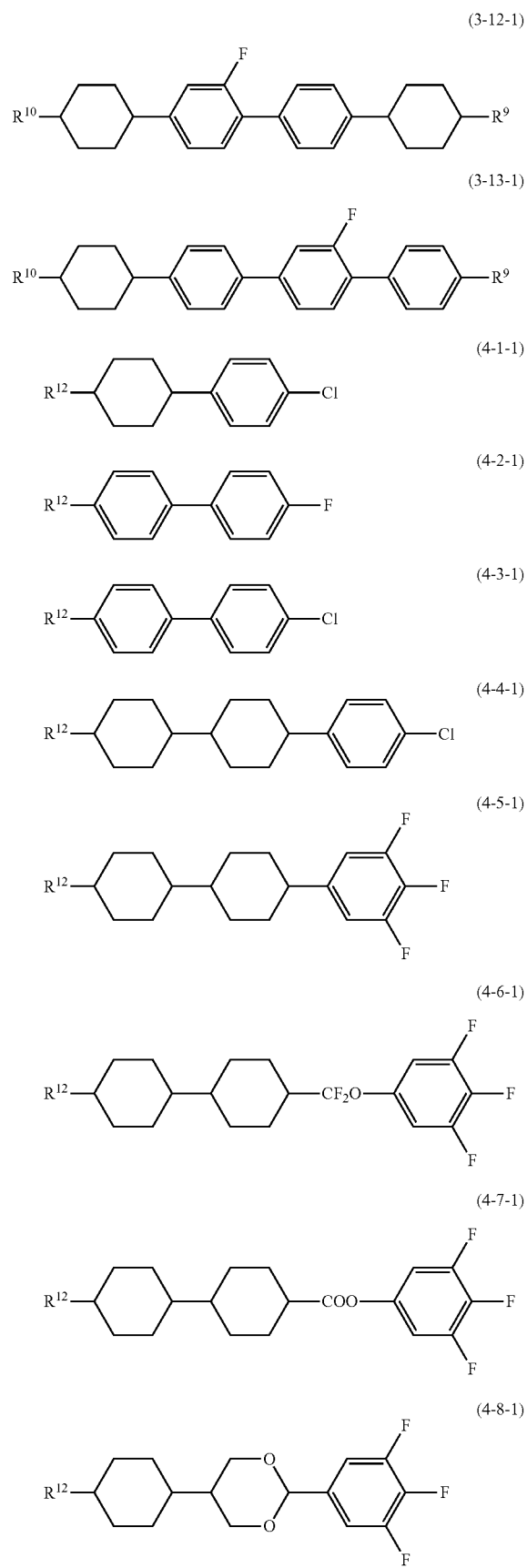

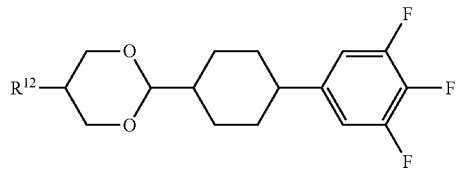
(4-9-1)

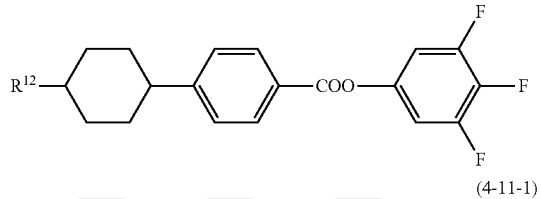
(4-10-1)

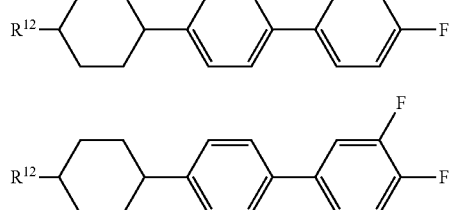
(4-11-1)

(4-12-1)

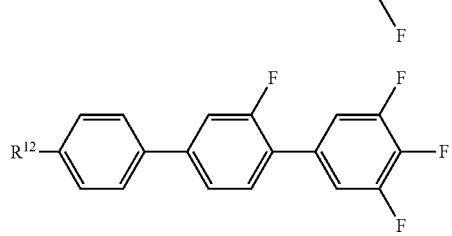
(4-13-1)

(4-14-1)

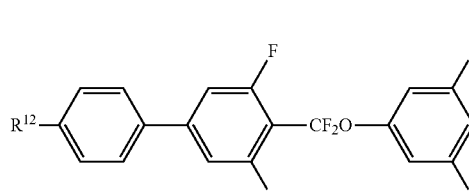
(4-15-1)

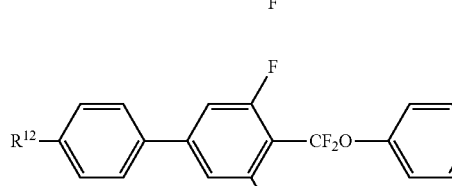
(4-16-1)

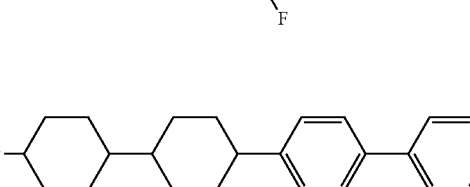
(4-17-1)

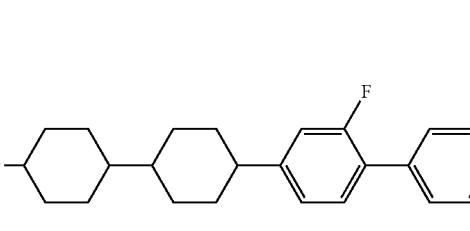

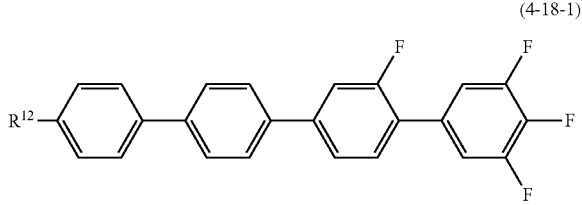
(4-18-1)

(4-19-1)

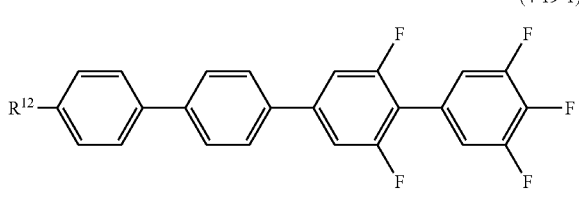
(5-1-1)

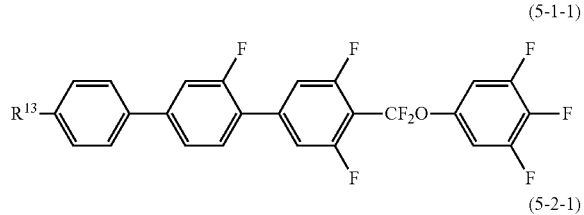
(5-2-1)

(5-3-1)

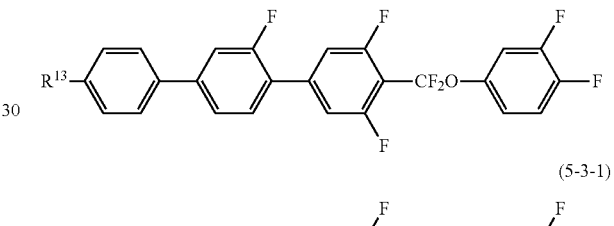
(5-4-1)

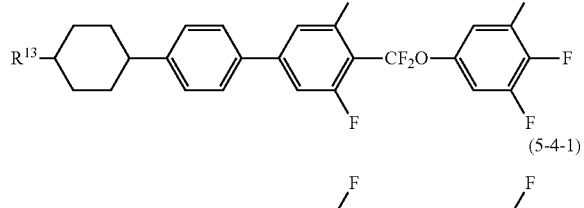
(5-5-1)

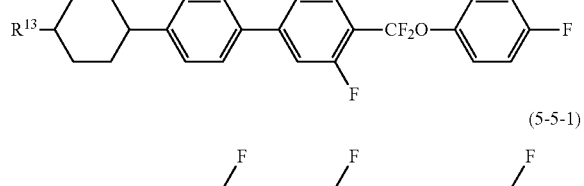

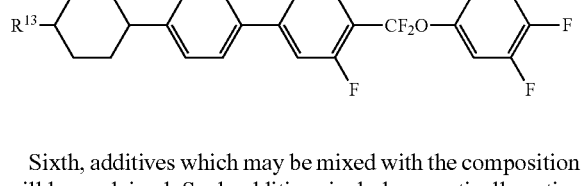

Sixth, additives which may be mixed with the composition will be explained. Such additives include an optically active compound, an antioxidant, an ultraviolet light absorber, a coloring matter, an antifoaming agent, a polymerizable compound and a polymerization initiator. The optically active compound is mixed with the composition for the purpose of inducing a helical structure and giving a twist angle in liquid crystals. Examples of such compounds include the compound (6-1) to the compound (6-5). A desirable ratio of the optically active compound is approximately 5% by weight or less, and a more desirable ratio is in the range of approximately 0.01% by weight to approximately 2% by weight.

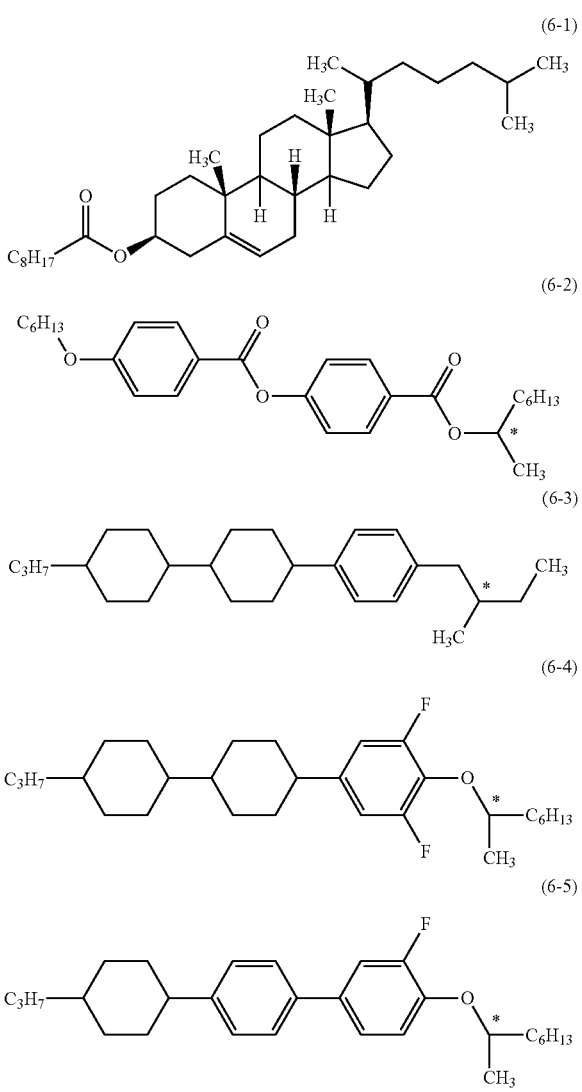

An antioxidant is mixed with the composition in order to prevent a decrease in specific resistance that is caused by heating under air, or to maintain a large voltage holding ratio at room temperature and also at a temperature close to the maximum temperature of a nematic phase after the device was used for a long time.

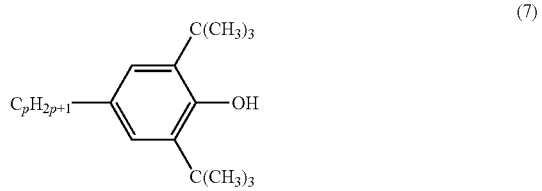

Desirable examples of the antioxidant include the compound (7) where p is an integer from 1 to 9. In the compound (7), desirable p is 1, 3, 5, 7 or 9. More desirable p is 1 or 7. The compound (7) where p is 1 is effective in preventing a decrease in specific resistance that is caused by heating under air, because it has a large volatility. The compound (7) where p is 7 is effective in maintaining a large voltage holding ratio at room temperature and also at a temperature close to the maximum temperature of a nematic phase even after the device has been used for a long time, because it has a small volatility. A desirable ratio of the antioxidant is approximately 50 ppm or more for achieving its effect and is approximately 600 ppm or less for avoiding a decrease in the maximum temperature or avoiding an increase in the minimum temperature. A more desirable ratio is in the range of approximately 100 ppm to approximately 300 ppm.

Desirable examples of the ultraviolet light absorber include a benzophenone derivative, a benzoate derivative and a triazole derivative. A light stabilizer such as an amine having steric hindrance is also desirable. A desirable ratio of the ultraviolet light absorber or the light stabilizer is approximately 50 ppm or more for achieving its effect and is approximately 10,000 ppm or less for avoiding a decrease in the maximum temperature or avoiding an increase in the minimum temperature. A more desirable ratio is in the range of approximately 100 ppm to approximately 10,000 ppm.

A dichroic dye such as an azo dye or an anthraquinone dye is mixed with the composition for adjusting to a device having a guest host (GH) mode. A desirable ratio of the coloring matter is in the range of approximately 0.01% by weight to approximately 10% by weight. An antifoaming agent such as dimethyl silicone oil or methyl phenyl silicone oil is mixed with the composition for preventing foam formation. A desirable ratio of the antifoaming agent is approximately 1 ppm or more for achieving its effect and is approximately 1,000 ppm or less for avoiding a poor display. A more desirable ratio is in the range of approximately 1 ppm to approximately 500 ppm.

A polymerizable compound is mixed with the composition for adjusting to a device having a PSA (polymer sustained alignment) mode. Desirable examples of the polymerizable compound include compounds having a polymerizable group, such as acrylates, methacrylates, vinyl compounds, vinyloxy compounds, propenyl ethers, epoxy compounds (oxiranes, oxetanes) and vinyl ketones. Especially desirable examples of the polymerizable compound are acrylate derivatives or methacrylate derivatives. A desirable ratio of the polymerizable compound is approximately 0.05% by weight or more for achieving its effect and is approximately 10% by weight or less for avoiding a poor display. A more desirable ratio is in the range of approximately 0.1% by weight to approximately 2% by weight. The polymerizable compound is polymerized on irradiation with ultraviolet light or the like, preferably in the presence of a suitable initiator such as a photopolymerization initiator. Suitable conditions for polymerization, and a suitable type and amount of the initiator are known to a person skilled in the art and are described in the literature. For example, Irgacure 651 (registered trademark), Irgacure 184 (registered trademark) or Darocure 1173 (registered trademark) (available from BASF), each of which is a photoinitiator, is suitable for radical polymerization. A desirable ratio of the photopolymerization initiator is in the range of approximately 0.1% by weight to approximately 5% by weight, and an especially desirable ratio is in the range of approximately 1% by weight to approximately 3% by weight based on the polymerizable compound.

Seventh, methods for synthesizing the component compounds will be explained. These compounds (1) to (5) can be prepared by known methods. The synthetic methods will be exemplified as follows. The compound (1-1-1) is prepared by the method described in JP H10-251186 A (1998). The compound (2-1-1) is prepared by the method described in JP H10-251186 A (1998). The compound (3-1-1) is prepared by the method described in JP S59-070624 A (1984) and JP S59-176221 A (1984). The compound (3-5-1) is prepared by the method described in JP S57-165328 A (1982) and JP S59-176221 A (1984). The compound (4-5-1) is prepared by the method described in JP H02-233626 A (1990). The compound (5-1-1) is prepared by the method described in JP H10-251186 A (1998). The compound with formula (7) where p is 1 is available from Sigma-Aldrich Corporation. The compound (7) where p is 7 or the like is synthesized according to the method described in U.S. Pat. No. 3,660,505.

Compounds whose synthetic methods are not described above can be prepared according to the methods described in books such as Organic Syntheses (John Wiley & Sons, Inc.), Organic Reactions (John Wiley & Sons, Inc.), Comprehensive Organic Synthesis (Pergamon Press), New experimental Chemistry Course (Shin Jikken Kagaku Kouza, in Japanese; Maruzen Co., Ltd.). The composition is prepared according to known methods using the compounds thus obtained. For example, the component compounds are mixed and dissolved in each other by heating.

Last, use of the composition will be explained. The composition mainly has a minimum temperature of approximately −10° C. or lower, a maximum temperature of approximately 70° C. or higher, and an optical anisotropy in the range of approximately 0.07 to approximately 0.20. A device containing the composition has a large voltage holding ratio. The composition is suitable for an AM device. The composition is suitable especially for an AM device having a transmission type. The composition having an optical anisotropy in the range of approximately 0.08 to approximately 0.25, and also the composition having an optical anisotropy in the range of approximately 0.10 to approximately 0.30 may be prepared by adjusting ratios of the component compounds or by mixing with any other liquid crystal compound. The composition can be used as a composition having a nematic phase and as an optically active composition by adding an optically active compound.

The composition can be used for an AM device. It can also be used for a PM device. The composition can also be used for the AM device and the PM device having a mode such as PC, TN, STN, ECB, OCB, IPS, FFS, VA or PSA. It is especially desirable to use the composition for the AM device having the TN, OCB, IPS or FFS mode. In an AM device having an IPS mode or an FFS mode, the orientation of liquid crystal molecules may be parallel or perpendicular to the panel substrate when no voltage is applied. These devices may be of a reflection type, a transmission type or a semi-transmission type. It is desirable to use the composition for a device having the transmission type. It can also be used for an amorphous silicon-TFT device or a polycrystal silicon-TFT device. The composition is also usable for a nematic curvilinear aligned phase (NCAP) device prepared by microcapsulating the composition, and for a polymer dispersed (PD) device in which a three-dimensional network-polymer is formed in the composition.

It will be apparent to those skilled in the art that various modifications and variations can be made in the invention and specific examples provided herein without departing from the spirit or scope of the invention. Thus, it is intended that the invention covers the modifications and variations of this invention that come within the scope of any claims and their equivalents.

The following examples are for illustrative purposes only and are not intended, nor should they be interpreted to, limit the scope of the invention.

EXAMPLES

A composition and a compound were a subject for measurement in order to evaluate the characteristics of the composition and the compound that will be included in the composition. When the subject for measurement was a composition, the composition itself was measured as a sample, and the value obtained was described here. When a subject for measurement was a compound, a sample for measurement was prepared by mixing 15% by weight of the compound and 85% by weight of mother liquid crystals. The characteristic values of the compound were calculated from values obtained by measurement, according to a method of extrapolation. That is to say that (extrapolated value)=[(measured value of a sample for measurement)−0.85×(measured value of mother liquid crystals)]/0.15. When a smectic phase (or crystals) separated out in this ratio at 25° C., the ratio of the compound to the mother liquid crystals was changed step by step in the order of (10% by weight/90% by weight), (5% by weight/95% by weight) and (1% by weight/99% by weight). The values of the maximum temperature, the optical anisotropy, the viscosity and the dielectric anisotropy with regard to the compound were obtained by this extrapolation method.

The components of the mother liquid crystals were as follows. The ratios were expressed as a percentage by weight.

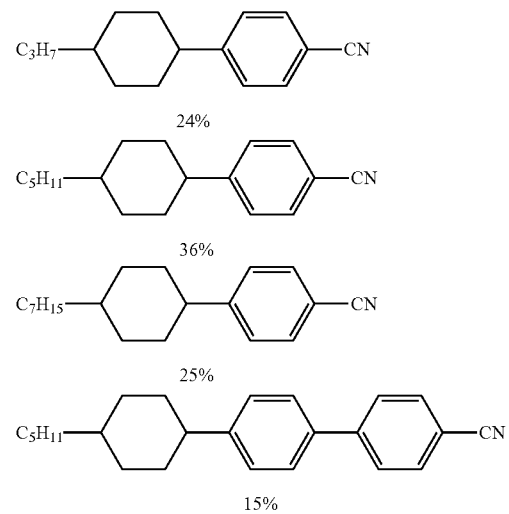

Characteristics were measured according to the following methods. Most are methods described in the JEITA standards (JEITA-ED-2521B) which was deliberated and established by Japan Electronics and Information Technology Industries Association (abbreviated to JEITA), or the modified methods.

Maximum Temperature of a Nematic Phase (NI; ° C.): A sample was placed on a hot plate in a melting point apparatus equipped with a polarizing microscope and was heated at the rate of 1° C. per minute. The temperature was measured when part of the sample began to change from a nematic phase to an isotropic liquid. A higher limit of the temperature range of a nematic phase may be abbreviated to "the maximum temperature."

Minimum Temperature of a Nematic Phase (Tc; ° C.): A sample having a nematic phase was put in glass vials and then kept in freezers at temperatures of 0° C., −10° C., −20° C., −30° C. and −40° C. for 10 days, and then the liquid crystal phases were observed. For example, when the sample maintained the nematic phase at −20° C. and changed to crystals or a smectic phase at −30° C., Tc was expressed as <−20° C. A lower limit of the temperature range of a nematic phase may be abbreviated to "the minimum temperature."

Viscosity (bulk viscosity; η; measured at 20° C.; mPa·s): Viscosity was measured by use of an E-type viscometer.

Viscosity (rotational viscosity; γ1; measured at 25° C.; mPa·s): Measurement was carried out according to the method described in M. Imai, et al., Molecular Crystals and Liquid Crystals, Vol. 259, 37 (1995). A sample was poured into a TN device in which the twist angle was 0 degrees and the distance between the two glass substrates (cell gap) was 5 micrometers. A voltage with an increment of 0.5 V in the range of 16 V to 19.5 V was applied stepwise to the device. After a period of 0.2 second with no voltage, a voltage was applied repeatedly under the conditions of only one rectangular wave (rectangular pulse; 0.2 second) and of no voltage (2 seconds). The peak current and the peak time of the transient current generated by the applied voltage were measured. The value of rotational viscosity was obtained from the measured values and the calculating equation (8) on page 40 of the paper presented by M. Imai, et al. The value of dielectric anisotropy necessary for this calculation was obtained by use of the device that had been used for the measurement of this rotational viscosity, according to the method that will be described below.

Optical Anisotropy (refractive index anisotropy; Δn; measured at 25° C.): Measurement was carried out by use of an Abbe refractometer with a polarizing plate mounted on the ocular, using light at a wavelength of 589 nanometers. The surface of the main prism was rubbed in one direction, and then a sample was dropped on the main prism. A refractive index (n∥) was measured when the direction of polarized light was parallel to that of the rubbing. A refractive index (n⊥) was measured when the direction of polarized light was perpendicular to that of the rubbing. The value of optical anisotropy was calculated from the equation: $\Delta n = n\| - n\bot$.

Dielectric Anisotropy (Δ∈; measured at 25° C.): A sample was poured into a TN device in which the distance between the two glass substrates (cell gap) was 9 micrometers and the twist angle was 80 degrees. Sine waves (10 V, 1 kHz) were applied to this device, and a dielectric constant (∈∥) in the major axis direction of liquid crystal molecules was measured after 2 seconds. Sine waves (0.5 V, 1 kHz) were applied to the device and a dielectric constant (∈⊥) in the minor axis direction of the liquid crystal molecules was measured after 2 seconds. The value of dielectric anisotropy was calculated from the equation: $\Delta\in = \in\| - \in\bot$.

Threshold Voltage (Vth; measured at 25° C.; V): Measurement was carried out with an LCD evaluation system Model LCD-5100 made by Otsuka Electronics Co., Ltd. The light source was a halogen lamp. A sample was poured into a TN device having a normally white mode, in which the distance between the two glass substrates (cell gap) was about 0.45/Δn (micrometers) and the twist angle was 80 degrees. A voltage to be applied to the device (32 Hz, rectangular waves) was stepwise increased in 0.02 V increments from 0 V up to 10 V. During the increase, the device was irradiated with light in the perpendicular direction, and the amount of light passing through the device was measured. A voltage-transmittance curve was prepared, in which the maximum amount of light corresponded to 100% transmittance and the minimum amount of light corresponded to 0% transmittance. The threshold voltage is voltage at 90% transmittance.

Voltage Holding Ratio (VHR-1; measured at 25° C.; %): A TN device used for measurement had a polyimide-alignment film, and the distance between the two glass substrates (cell gap) was 5 micrometers. A sample was poured into the device, and then the device was sealed with an adhesive curable on irradiation with ultraviolet light. A pulse voltage (60 microseconds at 5 V) was applied to the device and the device was charged. A decreasing voltage was measured for 16.7 milliseconds with a high-speed voltmeter, and the area A between the voltage curve and the horizontal axis in a unit cycle was obtained. The area B was an area without the decrease. The voltage holding ratio was the percentage of the area A to the area B.

Voltage Holding Ratio (VHR-2; measured at 80° C.; %): A TN device used for measurement had a polyimide-alignment film, and the distance between the two glass substrates (cell gap) was 5 micrometers. A sample was poured into the device, and then the device was sealed with an adhesive curable on irradiation with ultraviolet light. A pulse voltage (60 microseconds at 5 V) was applied to the TN device and the device was charged. A decreasing voltage was measured for 16.7 milliseconds with a high-speed voltmeter and the area A between the voltage curve and the horizontal axis in a unit cycle was obtained. The area B was an area without the decrease. The voltage holding ratio was a percentage of the area A to the area B.

Voltage Holding Ratio (VHR-3; measured at 25° C.; %): The stability to ultraviolet light was evaluated by measuring a voltage holding ratio after irradiation with ultraviolet light. A TN device used for measurement had a polyimide-alignment film and the cell gap was 5 micrometers. A sample was poured into this device, and then the device was irradiated with light for 20 minutes. The light source was an ultra high-pressure mercury lamp USH-500D (produced by Ushio, Inc.), and the distance between the device and the light source was 20 centimeters. In the measurement of VHR-3, a decreasing voltage was measured for 16.7 milliseconds. A composition having a large VHR-3 has a high stability to ultraviolet light. The value of VHR-3 is preferably 90% or more, and more preferably 95% or more.

Voltage Holding Ratio (VHR-4; measured at 25° C.; %): A TN device into which a sample was poured was heated in a constant-temperature bath at 80° C. for 500 hours, and then the stability to heat was evaluated by measuring the voltage holding ratio. In the measurement of VHR-4, a decreasing voltage was measured for 16.7 milliseconds. A composition having a large VHR-4 has a high stability to heat.

Response Time (τ; measured at 25° C.; millisecond): Measurement was carried out with an LCD evaluation system Model LCD-5100 made by Otsuka Electronics Co., Ltd. The light source was a halogen lamp. The low-pass filter was set at 5 kHz. A sample was poured into a TN device having a normally white mode, in which the cell gap between the two glass substrates was 5.0 micrometers and the twist angle was 80 degrees. Rectangular waves (60 Hz, 5 V, 0.5 second) were applied to this device. The device was simultaneously irradiated with light in the perpendicular direction, and the amount of light passing through the device was measured. The maximum amount of light corresponded to 100% transmittance, and the minimum amount of light corresponded to 0% transmittance. Rise time (τr; millisecond) was the time required for a change from 90% to 10% transmittance. Fall time (τf; millisecond) was the time required for a change from 10% to 90% transmittance. The response time was the sum of the rise time and the fall time thus obtained.

Elastic Constant (K; measured at 25° C.; pN): Measurement was carried out with an LCR meter Model HP 4284A made by Yokogawa-Hewlett-Packard Company. A sample was put in a homogeneous cell in which the distance between the two glass substrates (cell gap) was 20 micrometers. An electric charge of 0 V to 20 V was applied to the cell, and electrostatic capacity and applied voltage were measured. The measured values of the electrostatic capacity (C) and the applied voltage (V) were fitted to equation (2.98) and equation (2.101) on page 75 of Liquid Crystal Device Handbook (Ekishou Debaisu Handobukku, in Japanese; the Nikkan Kogyo Shimbun, Ltd.), giving the values of K11 and K33 from equation (2.99). Next, K22 was calculated form equation (3.18) on page 171 using the values of K11 and K33. The elastic constant was the average value of K11, K22 and K33 thus obtained.

Specific Resistance ($\rho$; measured at 25° C.; $\Omega$ cm): A sample (1.0 milliliters) was poured into a vessel equipped with electrodes. A DC voltage (10 V) was applied to the vessel, and the DC current was measured after 10 seconds. The specific resistance was calculated from the following equation:

(specific resistance)=[(voltage)×(electric capacity of vessel)]/[(DC current)×(dielectric constant in vacuum)].

Helical pitch (P; measured at room temperature; micrometer): The helical pitch was measured according to the wedge method (see page 196 of Liquid Crystal Handbook (Ekishou Binran, in Japanese; Maruzen, Co., Ltd., 2000). After a sample had been injected into a wedge-shaped cell and the cell had been allowed to stand at room temperature for 2 hours, the interval (d2−d1) of disclination lines was observed with a polarizing microscope (Nikon Corporation, Model MM-40/60 series). The helical pitch (P) was calculated from the following equation, where θ was defined as the angle of the wedge cell: $P=2\times(d2-d1)\times\tan\theta$.

Gas Chromatographic Analysis: A gas chromatograph Model GC-14B made by Shimadzu Corporation was used for measurement. The carrier gas was helium (2 milliliters per minute). The sample injector and the detector (FID) were set to 280° C. and 300° C., respectively. A capillary column DB-1 (length 30 meters, bore 0.32 millimeter, film thickness 0.25 micrometer, dimethylpolysiloxane as the stationary phase, non-polar) made by Agilent Technologies, Inc. was used for the separation of component compounds. After the column had been kept at 200° C. for 2 minutes, it was further heated to 280° C. at the rate of 5° C. per minute. A sample was dissolved in acetone (0.1% by weight), and 1 microliter of the solution was injected into the sample injector. A recorder used was a Model C-R5A Chromatopac Integrator made by Shimadzu Corporation or its equivalent. The resulting gas chromatogram showed the retention time of peaks and the peak areas corresponding to the component compounds.

Solvents for diluting the sample may also be chloroform, hexane and so forth. The following capillary columns may also be used in order to separate the component compounds: HP-1 (length 30 meters, bore 0.32 millimeter, film thickness 0.25 micrometer) made by Agilent Technologies Inc., Rtx-1 (length 30 meters, bore 0.32 millimeter, film thickness 0.25 micrometer) made by Restek Corporation, and BP-1 (length 30 meters, bore 0.32 millimeter, film thickness 0.25 micrometer) made by SGE International Pty. Ltd. A capillary column CBP1-M50-025 (length 50 meters, bore 0.25 millimeter, film thickness 0.25 micrometer) made by Shimadzu Corporation may also be used for the purpose of avoiding an overlap of peaks of the compounds.

The ratio of the liquid crystal compounds included in the composition may be calculated according to the following method. The liquid crystal compounds are detected by use of a gas chromatograph. The ratio of peak areas in the gas chromatogram corresponds to the ratio (molar ratio) of the liquid crystal compounds. When the capillary columns described above are used, the correction coefficient of respective liquid crystal compounds may be regarded as 1 (one). Accordingly, the ratio (% by weight) of the liquid crystal compound can be calculated from the ratio of peak areas.

The invention will be explained in detail by way of Examples. The invention is not limited by Examples described below. The compounds described in Comparative Examples and Examples will be expressed in terms of symbols according to the definition in the following Table 3. In Table 3, the configuration of 1,4-cyclohexylene is trans. A parenthesized number next to the symbolized compound in Example corresponds to the number of a compound. The symbol (-) means any other liquid crystal compound. Ratios (percentage) of liquid crystal compounds mean the percentages by weight (% by weight) based on the total weight of the liquid crystal composition. The liquid crystal composition further includes an impurity. Last, the characteristic values of the composition are summarized.

TABLE 3

Method of Description of Compound using Symbols
$R-(A_1)-Z_1-\ldots-Z_n-(A_n)-R'$

| 1) Left Terminal Group R— | Symbol |
|---|---|
| $C_nH_{2n+1}-$ | n- |
| $C_nH_{2n+1}O-$ | nO— |
| $C_mH_{2m+1}OC_nH_{2n}-$ | mOn— |
| $CH_2=CH-$ | V— |
| $C_nH_{2n+1}-CH=CH-$ | nV— |
| $CH_2=CH-C_nH_{2n}-$ | Vn— |
| $C_mH_{2m+1}-CH=CH-C_nH_{2n}-$ | mVn— |
| $CF_2=CH-$ | VFF— |
| $CF_2=CH-C_nH_{2n}-$ | VFFn— |
| $CH_2=CHCH_2CH_2CH=CHCH_2CH_2-$ | V2V2— |
| $C_nH_{2n+1}CH_2=CHCH_2CH_2CH=CHCH_2CH_2-$ | nV2V2— |

| 2) Right Terminal Group —R' | Symbol |
|---|---|
| $-C_nH_{2n+1}$ | -n |
| $-OC_nH_{2n+1}$ | —On |
| $-CH=CH_2$ | —V |
| $-CH=CH-C_nH_{2n+1}$ | —Vn |
| $-C_nH_{2n}-CH=CH_2$ | —nV |
| $-CH=CF_2$ | —VFF |
| $-F$ | —F |
| $-Cl$ | —CL |
| $-OCF_3$ | —OCF3 |
| $-CN$ | —C |

| 3) Bonding group —Zn— | Symbol |
|---|---|
| $-C_2H_4-$ | 2 |
| $-COO-$ | E |
| $-CH=CH-$ | V |
| $-C\equiv C-$ | T |
| $-CF_2O-$ | X |
| $-CH=CH-CF_2O-$ | VX |

| 4) Ring Structure —An— | Symbol |
|---|---|
| 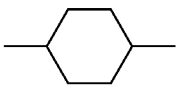 | H |
| 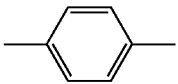 | B |
| 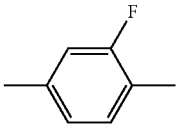 | B(F) |

TABLE 3-continued

Method of Description of Compound using Symbols
R—(A₁)—Z₁—...—Zₙ—(Aₙ)—R'

| Structure | Symbol |
|---|---|
| (fluorobenzene) | B(2F) |
| (difluorobenzene) | B(F,F) |
| (trifluorobenzene) | B(2F,5F) |
| (pyrimidine) | Py |
| (tetrahydropyran) | dh |
| (dioxane) | G |

5) Example of Description

Example 1

3-B(F,F)XB(F)—OCF3

Example 2

3-HBBXB(F,F)—F

Example 3

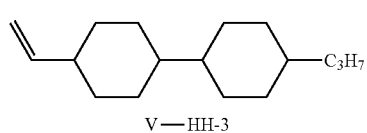

V—HH-3

Example 4

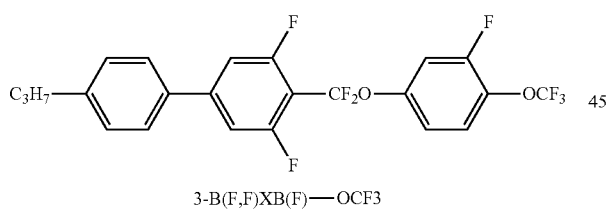

3-BB(F)B(F,F)—F

Comparative Example 1

Example 2 was selected from the compositions disclosed in JP 2006-089703 A. The basis of the selection was that the composition included the compound (1-1), the compound (3-1-1), the compound (3-5-1) the compound (4-1-1) the compound (4-11-1) the compound (4-14-1) and the compound (4). The components and characteristics of the composition were as follows. The composition was prepared and measured by the method described above as the dielectric anisotropy ($\Delta\epsilon$) was not described.

| Compound | Code | % |
|---|---|---|
| 3-BB(F,F)XB(F)—OCF3 | (1-1-1) | 3% |
| V—HH-5 | (3-1-1) | 16% |
| 1V—HH-3 | (3-1-1) | 13% |
| V—HHB-1 | (3-5-1) | 19% |
| V2—HHB-1 | (3-5-1) | 10% |
| 3-HB—CL | (4-1-1) | 11% |
| 2-HBB—F | (4-11-1) | 4% |
| 3-HBB—F | (4-11-1) | 4% |
| 3-BB(F,F)XB(F,F)—F | (4-14-1) | 13% |
| 3-HHEB—F | (4) | 2% |
| 3-HB(F,F)XB(F,F)—F | (4) | 3% |
| 3-HHB—OCF3 | (—) | 2% |

NI=79.8° C.; Tc≦−30° C.; $\Delta n$=0.096; $\Delta\epsilon$=4.4; $\eta$=12.6 mPa·s; Vth=1.99V; VHR-1=99.4%; VHR-2=97.4%; $\tau$=9.7 ms.

Comparative Example 2

Example 22 was selected from the compositions disclosed in JP 2008-133470 A. The basis of the selection was that the composition included the compound (1-1-1), the compound (3-1-1), the compound (3-5-1) the compound (3-7-1), the compound (4-12-1) the compound (4-13-1), the compound (4-15-1) the compound (4-16-1), the compound (4-17-1) and the compound (4). The components and characteristics of the composition were as follows.

| Compound | Code | % |
|---|---|---|
| 2-BB(F,F)XB(F)—OCF3 | (1-1-1) | 5% |
| V—HH-4 | (3-1-1) | 5% |
| V—HHB-3 | (3-5-1) | 5% |
| 2-BB(F)B-3 | (3-7-1) | 5% |
| 2-HBB(F,F)—F | (4-12-1) | 5% |
| 3-HBB(F,F)—F | (4-12-1) | 5% |
| 5-HBB(F,F)—F | (4-12-1) | 5% |
| V2V2-BB(F)B(F,F)—F | (4-13-1) | 10% |
| 1V2V2-BB(F)B(F,F)—F | (4-13-1) | 10% |
| 5-BB(F,F)XB(F)—F | (4-15-1) | 5% |
| 3-HHBB(F,F)—F | (4-16-1) | 5% |

| | | |
|---|---|---|
| 5-HHBB(F,F)—F | (4-16-1) | 5% |
| 3-HHB(F)B(F,F)—F | (4-16-1) | 5% |
| 5-HHB(F)B(F,F)—F | (4-17-1) | 5% |
| 2-HB(F)B(F,F)—F | (4) | 5% |
| 3-HB(F)B(F,F)—F | (4) | 5% |
| 5-HB(F)B(F,F)—F | (4) | 5% |
| 4-BB(F,F)XB(F,F)—OCF3 | (—) | 5% |

NI=124.4° C.; Tc≦−20° C.; Δn=0.176; Δ∈=12.4; η=39.1 mPa·s; Vth=1.39V; VHR-1=99.5%.

Comparative Example 3

Example 6 was selected from the compositions disclosed in JP 2010-050324 A. The basis of the selection was that the composition included the compound (1-1-1), the compound (2), the compound (3-1-1) the compound (3-5-1), the compound (3-7-1), the compound (4-2-1) and the compound (5). The composition was prepared and measured by the method described above as the bulk viscosity (η) was not described.

The components and characteristics of the composition were as follows.

| | | |
|---|---|---|
| 3-BB(F,F)XB(F)—OCF3 | (1-1-1) | 6% |
| 3-HHBXB(F)—F | (2) | 8% |
| 4-HHBXB(F)—F | (2) | 8% |
| V—HH-3 | (3-1-1) | 47% |
| V—HHB-1 | (3-5-1) | 4% |
| 3-HHB—O1 | (3-5-1) | 4% |
| V2-BB(F)B-1 | (3-7-1) | 4% |
| V2-BB(F)B-2 | (3-7-1) | 3% |
| 1V2-BB—F | (4-2-1) | 4% |
| 3-HBB(F,F)XB(F)—OCF3 | (5) | 4% |
| 4-HBB(F,F)XB(F)—OCF3 | (5) | 4% |
| 3-HHXB(F)—OCF3 | (—) | 4% |

NI=87.4° C.; Tc≦−20° C.; Δn=0.108; Δ∈=3.8; γ1=47.2 mPa·s; η=14.4 mPa·s; τ=6.8 ms; VHR-1=99.3%; VHR-2=98.2%; VHR-1=98.1%.

Example 1

| | | |
|---|---|---|
| 3-BB(F,F)XB(F)—OCF3 | (1-1-1) | 6% |
| 3-HBBXB(F,F)—F | (2-1-1) | 7% |
| 5-HBBXB(F,F)—F | (2-1-1) | 8% |
| V—HH-3 | (3-1-1) | 40% |
| V—HHB-1 | (3-5-1) | 5% |
| 1-BB(F)B-2V | (3-7-1) | 5% |
| 2-BB(F)B-2V | (3-7-1) | 3% |
| 3-HHXB(F,F)—F | (4-6-1) | 8% |
| 3-HBB(F,F)—F | (4-12-1) | 10% |
| 3-BB(F,F)XB(F,F)—F | (4-14-1) | 8% |

NI=78.6° C.; Tc≦−20° C.; Δn=0.107; Δ∈=5.8; Vth=1.87 V; η=9.8 mPa·s; VHR-1=99.2%; VHR-2=98.2%; VHR-3=98.1%.

Example 2

| | | |
|---|---|---|
| 3-BB(F,F)XB(F)—OCF3 | (1-1-1) | 7% |
| 3-HBBXB(F,F)—F | (2-1-1) | 8% |
| 3-HH-4 | (3-1-1) | 30% |
| 3-HH-5 | (3-1-1) | 10% |
| 3-HB—O2 | (3-2-1) | 9% |
| 3-HHB-1 | (3-5-1) | 4% |
| 3-HHB—O1 | (3-5-1) | 4% |
| 5-HBB(F)B-2 | (3-13-1) | 4% |
| 5-HB—CL | (4-1-1) | 8% |
| 2-HHB—CL | (4-4-1) | 3% |
| 3-HHB—CL | (4-4-1) | 3% |
| 3-BB(F)B(F,F)—F | (4-13-1) | 4% |
| 3-HHB(F)B(F,F)—F | (4-17-1) | 3% |
| 4-BB(F)B(F,F)XB(F)—F | (5-1-1) | 3% |

NI=88.8° C.; Tc≦−30° C.; Δn=0.098; Δ∈=3.7; Vth=2.10 V; η=10.4 mPa·s; VHR-1=99.0%; VHR-2=98.3%; VHR-3=98.0%.

Example 3

| | | |
|---|---|---|
| 3-BB(F,F)XB(F)—OCF3 | (1-1-1) | 4% |
| 4-BB(F,F)XB(F)—OCF3 | (1-1-1) | 4% |
| 5-BB(F,F)XB(F)—OCF3 | (1-1-1) | 4% |
| 3-HBBXB(F,F)—F | (2-1-1) | 5% |
| 3-HHBXB(F,F)—F | (2-2-1) | 5% |
| V—HH-3 | (3-1-1) | 30% |
| 1V—HH-4 | (3-1-1) | 8% |
| 4-HHEH-3 | (3-4-1) | 5% |
| 4-HHEH-5 | (3-4-1) | 5% |
| 3-HB(F)HH-5 | (3-9-1) | 3% |
| 3-HB—CL | (4-1-1) | 5% |
| 1V2-BB—F | (4-2-1) | 4% |
| 1V2-BB—CL | (4-3-1) | 4% |
| 3-HHXB(F,F)—F | (4-6-1) | 4% |
| 3-HHEB(F,F)—F | (4-7-1) | 3% |
| 3-HBEB(F,F)—F | (4-10-1) | 3% |
| 3-BB(F,F)XB(F,F)—F | (4-14-1) | 4% |

NI=72.4° C.; Tc≦−20° C.; Δn=0.086; Δ∈=4.5; Vth=1.97 V; η=9.4 mPa·s; VHR-1=99.1%; VHR-2=98.2%; VHR-3=97.9%.

Example 4

| | | |
|---|---|---|
| 3-BB(F,F)XB(F)—OCF3 | (1-1-1) | 6% |
| 3-BB(F,F)XB—OCF3 | (1-2-1) | 5% |
| 3-HBBXB(F,F)—F | (2-1-1) | 6% |
| 4-HBBXB(F,F)—F | (2-1-1) | 5% |
| V—HH-3 | (3-1-1) | 30% |
| VFF—HH-3 | (3-1) | 8% |
| V2-BB-1 | (3-3-1) | 6% |
| 1V2-HBB-3 | (3-6-1) | 5% |
| 3-B(F)BB-2 | (3-8-1) | 5% |
| 3-HB(F)BH-3 | (3-12-1) | 3% |
| 3-HHB(F,F)—F | (4-5-1) | 5% |
| 3-HGB(F,F)—F | (4-8-1) | 3% |
| 3-HBB—F | (4-11-1) | 3% |
| 3-BB(F,F)XB(F)—F | (4-15-1) | 5% |
| 3-BB(F)B(F,F)XB(F)—F | (5-2-1) | 5% |

NI=77.1° C.; Tc≦−20° C.; Δn=0.113; Δ∈=5.4; Vth=1.91 V; η=10.3 mPa·s; VHR-1=99.0%; VHR-2=98.3%; VHR-3=98.0%.

Example 5

| 2-BB(F,F)XB(F)—OCF3 | (1-1-1) | 4% |
| 3-BB(F,F)XB(F)—OCF3 | (1-1-1) | 4% |
| 3-HBBXB(F,F)—F | (2-1-1) | 6% |
| 2-HH-3 | (3-1-1) | 12% |
| 3-HH—O1 | (3-1-1) | 5% |
| V—HH-3 | (3-1-1) | 30% |
| 1V2-HH-3 | (3-1-1) | 5% |
| V—HHB-1 | (3-5-1) | 5% |
| 1V2-HHB-1 | (3-5-1) | 4% |
| 3-HHEBH-3 | (3-10-1) | 3% |
| 1-HHXB(F,F)—F | (4-6-1) | 5% |
| 3-GHB(F,F)—F | (4-9-1) | 3% |
| 3-HHBB(F,F)—F | (4-16-1) | 3% |
| 3-BBB(F)B(F,F)—F | (4-18-1) | 3% |
| 2-HBB(F,F)XB(F,F)—F | (5-3-1) | 4% |
| 3-HBB(F,F)XB(F,F)—F | (5-3-1) | 4% |

NI=82.7° C.; Tc≦−20° C.; Δn=0.085; Δ∈=4.0; Vth=2.06 V; η=10.3 mPa·s; VHR-1=99.1%; VHR-2=98.2%; VHR-3=98.0%.

Example 6

| 3-BB(F,F)XB(F)—OCF3 | (1-1-1) | 8% |
| 2-HBBXB(F,F)—F | (2-1-1) | 3% |
| 3-HBBXB(F,F)—F | (2-1-1) | 3% |
| V—HH-3 | (3-1-1) | 40% |
| 1V—HH-3 | (3-1-1) | 3% |
| 7-HB-1 | (3-2-1) | 3% |
| 3-HB—O1 | (3-2-1) | 3% |
| V—HHB-1 | (3-5-1) | 6% |
| V2-HHB-1 | (3-5-1) | 5% |
| 5-HBBH-3 | (3-11-1) | 3% |
| 3-BB(F)B(F,F)—F | (4-13-1) | 4% |
| 3-BB(F,F)XB(F,F)—F | (4-14-1) | 7% |
| 3-BBB(F,F)B(F,F)—F | (4-19-1) | 3% |
| 3-BB(F)B(F,F)XB(F,F)—F | (5-1-1) | 3% |
| 3-HB(F)B(F,F)XB(F,F)—F | (5-5-1) | 3% |
| 3-PyBB—F | (—) | 3% |

NI=76.7° C.; Tc≦−20° C.; Δn=0.099; Δ∈=5.8; Vth=1.87 V; η=9.7 mPa·s; VHR-1=99.0%; VHR-2=98.2%; VHR-3=97.9%.

Example 7

| 3-BB(F,F)XB(F)—OCF3 | (1-1-1) | 4% |
| 3-BB(F,F)XB—OCF3 | (1-2-1) | 4% |
| 3-HBBXB(F,F)—F | (2-1-1) | 4% |
| 3-HBBXB(F)—OCF3 | (2) | 4% |
| 2-HH-3 | (3-1-1) | 25% |
| 2-HH-5 | (3-1-1) | 15% |
| 3-HHB-1 | (3-5-1) | 6% |
| 3-HHB-3 | (3-5-1) | 5% |
| 2-BB(F)B-3 | (3-7-1) | 5% |
| 3-HB—CL | (4-1-1) | 5% |
| 3-HBB(F,F)—F | (4-12-1) | 7% |

NI=75.2° C.; Tc≦−20° C.; Δn=0.095; Δ∈=4.3; Vth=2.04 V; η=9.4 mPa·s; VHR-1=99.1%; VHR-2=98.1%; VHR-3=97.8%.

The compositions in Example 1 to Example 7 have smaller viscosity than those of Comparative Example 1 to Comparative Example 3. Accordingly, the liquid crystal composition of the invention has excellent characteristics.

INDUSTRIAL APPLICABILITY

The invention provides a liquid crystal composition that satisfies at least one of characteristics such as a high maximum temperature of a nematic phase, a low minimum temperature of a nematic phase, a small viscosity, a suitable optical anisotropy, a large dielectric anisotropy, a large specific resistance, a large elastic constant, a high stability to ultraviolet light and a high stability to heat, or that is suitably balanced between at least two of the characteristics. A liquid crystal display device containing such a composition becomes an AM device that has a short response time, a large voltage holding ratio, a large contrast ratio, a long service life and so forth, and thus it can be used for a liquid crystal projector, a liquid crystal television and so forth.

Although the invention has been described and illustrated with a certain degree of particularity, it is understood that the disclosure has been made only by way of example, and that numerous changes in the conditions and order of steps can be resorted to by those skilled in the art without departing from the spirit and scope of the invention.

What is claimed is:

1. A liquid crystal composition having a nematic phase and comprising three components, wherein a first component is at least one compound selected from the group of compounds represented by formula (1), and a second component is at least one compound selected from the group of compounds represented by formula (2):

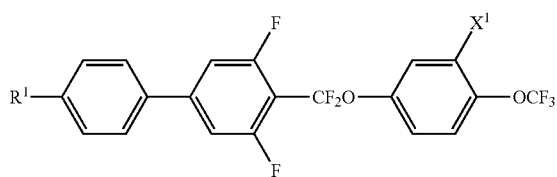

(1)

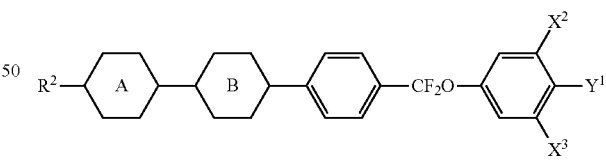

(2)

wherein $R^1$ and $R^2$ are each independently alkyl having 1 to 12 carbons, alkoxy having 1 to 12 carbons, alkenyl having 2 to 12 carbons or alkenyl having 2 to 12 carbons in which arbitrary hydrogen is replaced by fluorine; ring A and ring B are each independently 1,4-cyclohexylene or 1,4-phenylene, $X^1$, $X^2$ and $X^3$ are each independently hydrogen or fluorine; $Y^1$ is fluorine, chlorine or trifluoromethoxy.

2. The liquid crystal composition according to claim 1, wherein the first component is at least one compound selected from the group of compounds represented by formula (1-1) and formula (1-2):

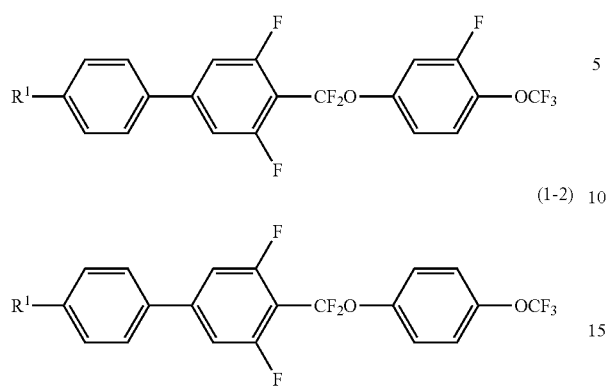

(1-1)

(1-2)

wherein $R^1$ is independently alkyl having 1 to 12 carbons, alkoxy having 1 to 12 carbons or alkenyl having 2 to 12 carbons.

3. The liquid crystal composition according to claim 1, wherein the second component is at least one compound selected from the group of compounds represented by formula (2-1) and formula (2-2):

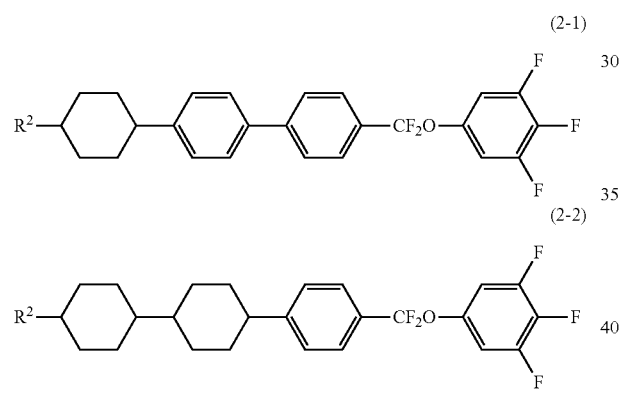

(2-1)

(2-2)

wherein $R^2$ is independently alkyl having 1 to 12 carbons, alkoxy having 1 to 12 carbons or alkenyl having 2 to 12 carbons.

4. The liquid crystal composition according to claim 1, wherein the ratio of the first component is in the range of approximately 5% by weight to approximately 50% by weight, the ratio of the second component is in the range of approximately 5% by weight to approximately 50% by weight, based on the total weight of the liquid crystal composition.

5. The liquid crystal composition according to claim 1, further comprising at least one compound selected from the group of compounds represented by formula (3) as a third component:

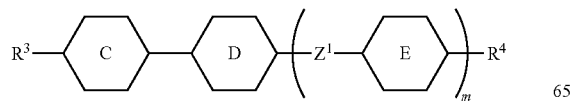

(3)

wherein $R^3$ and $R^4$ are each independently alkyl having 1 to 12 carbons, alkoxy having 1 to 12 carbons, alkenyl having 2 to 12 carbons or alkenyl having 2 to 12 carbons in which arbitrary hydrogen is replaced by fluorine; ring C, ring D and ring E are each independently 1,4-cyclohexylene, 1,4-phenylene, 2-fluoro-1,4-phenylene, 3-fluoro-1,4-phenylene, or 2,5-difluoro-1,4-phenylene; $Z^1$ is independently a single bond, ethylene or carbonyloxy; and m is 0, 1 or 2.

6. The liquid crystal composition according to claim 5, wherein the third component is at least one compound selected from the group of compounds represented by formula (3-1) to formula (3-13):

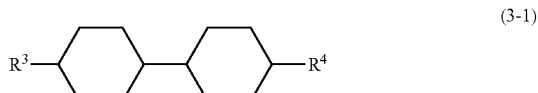

(3-1)

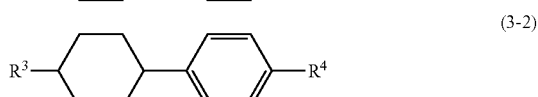

(3-2)

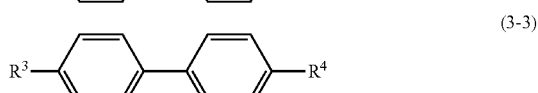

(3-3)

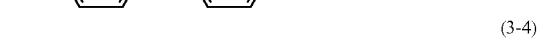

(3-4)

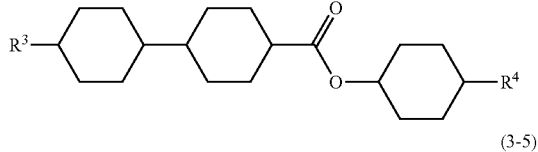

(3-5)

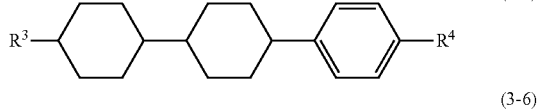

(3-6)

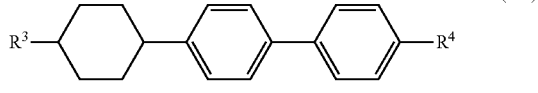

(3-7)

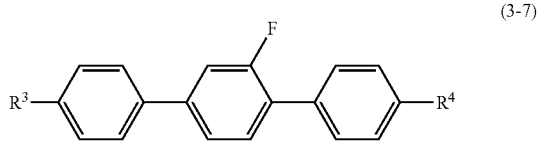

(3-8)

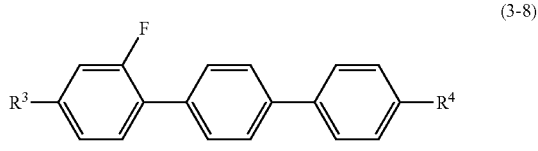

(3-9)

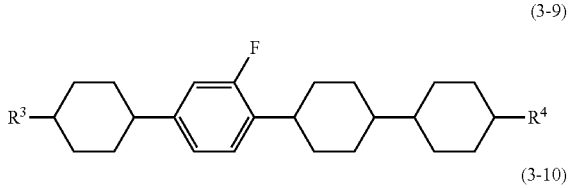

(3-10)

-continued (3-11)
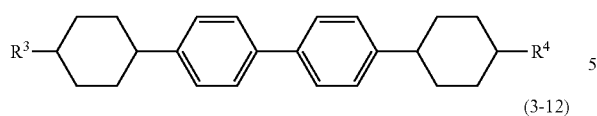

(3-12)
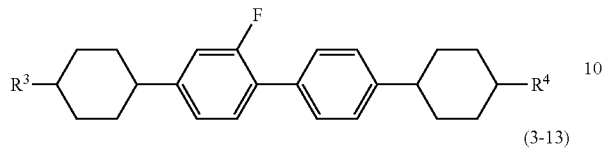

(3-13)
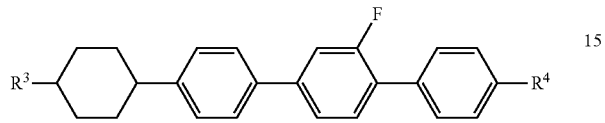

wherein $R^3$ and $R^4$ are each independently alkyl having 1 to 12 carbons, alkoxy having 1 to 12 carbons, alkoxymethyl having 2 to 12 carbons, alkenyl having 2 to 12 carbons, or alkenyl having 2 to 12 carbons in which arbitrary hydrogen is replaced by fluorine.

7. The liquid crystal composition according to claim 5 wherein the ratio of the third component is in the range of approximately 30% by weight to approximately 75% by weight based on the total weight of the liquid crystal composition.

8. The liquid crystal composition according to claim 1, further comprising at least one compound selected from the group of compounds represented by formula (4) as a fourth component:

(4)
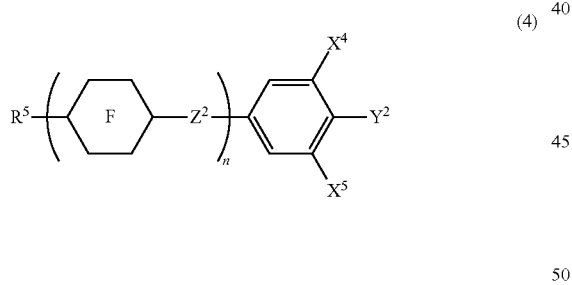

wherein $R^5$ is alkyl having 1 to 12 carbons, alkoxy having 1 to 12 carbons or alkenyl having 2 to 12 carbons; ring F is independently 1,4-cyclohexylene, 1,4-phenylene, 2-fluoro-1,4-phenylene, 3-fluoro-1,4-phenylene, 3,5-difluoro-1,4-phenylene, 1,3-dioxane-2,5-diyl or tetrahydropyran-2,5-diyl or pyrimidine-2,5-diyl; $X^4$ and $X^5$ are each independently hydrogen or fluorine; $Y^2$ is fluorine or chlorine; and $Z^2$ is independently a single bond, ethylene, carbonyloxy or difluoromethyleneoxy; n is 1, 2 or 3; and three of $Z^2$ are all single bonds when n is 3.

9. The liquid crystal composition according to claim 5, further comprising at least one compound selected from the group of compounds represented by formula (4) as a fourth component:

(4)
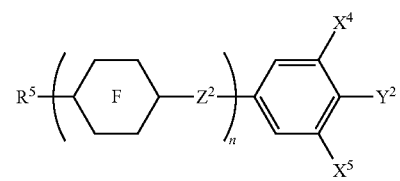

wherein $R^5$ is alkyl having 1 to 12 carbons, alkoxy having 1 to 12 carbons or alkenyl having 2 to 12 carbons; ring F is independently 1,4-cyclohexylene, 1,4-phenylene, 2-fluoro-1,4-phenylene, 3-fluoro-1,4-phenylene, 3,5-difluoro-1,4-phenylene, 1,3-dioxane-2,5-diyl or tetrahydropyran-2,5-diyl or pyrimidine-2,5-diyl; $X^4$ and $X^5$ are each independently hydrogen or fluorine; $Y^2$ is fluorine or chlorine; and $Z^2$ is independently a single bond, ethylene, carbonyloxy or difluoromethyleneoxy; n is 1, 2 or 3; and three of $Z^2$ are all single bonds when n is 3.

10. The liquid crystal composition according to claim 8, wherein the fourth component is at least one compound selected from the group of compounds represented by formula (4-1) to formula (4-19):

(4-1)
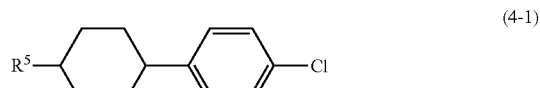

(4-2)
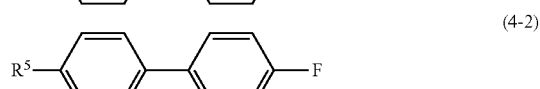

(4-3)
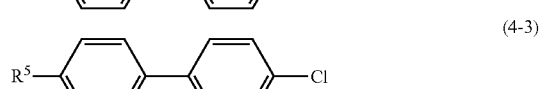

(4-4)
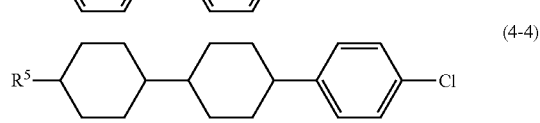

(4-5)
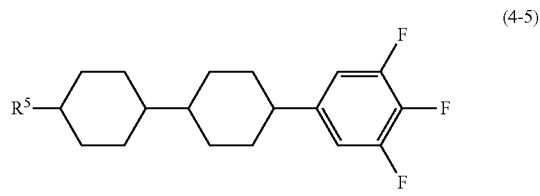

(4-6)
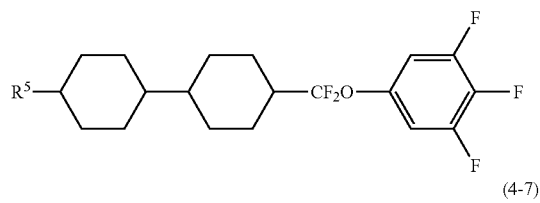

(4-7)
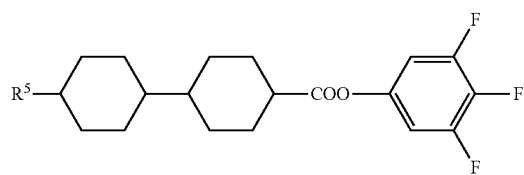

(4-8) 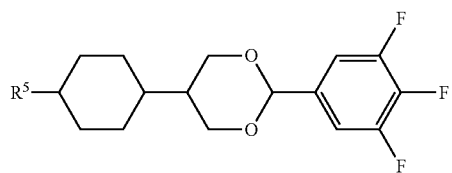
(4-9) 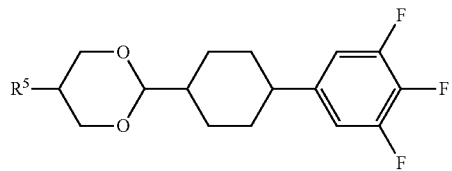
(4-10) 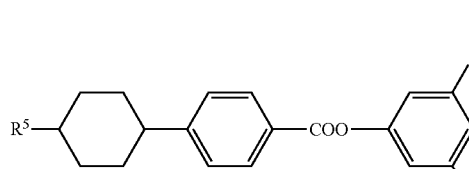
(4-11) 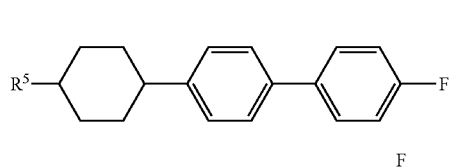
(4-12) 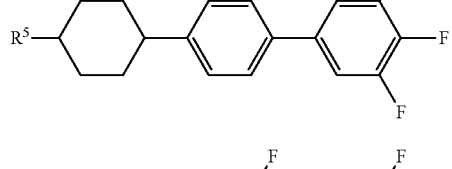
(4-13) 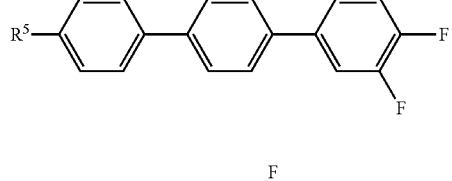
(4-14) 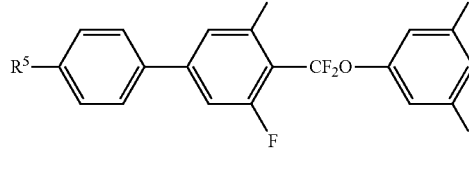
(4-15) 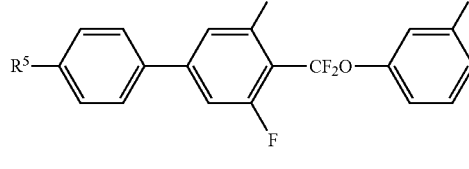
(4-16) 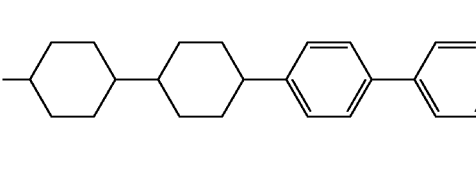
(4-17) 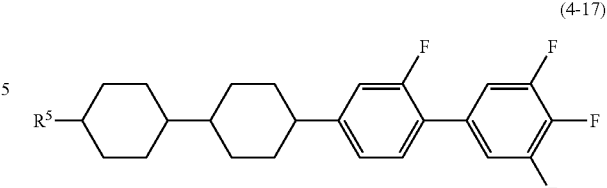
(4-18) 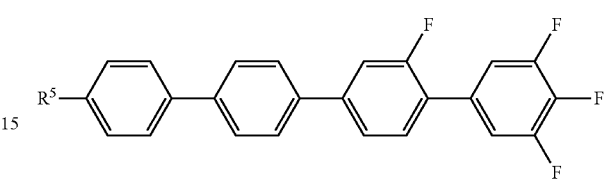
(4-19) 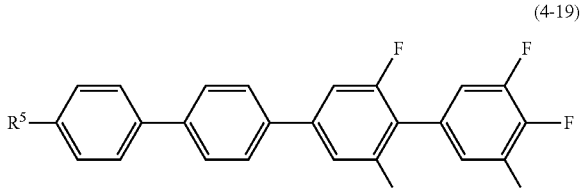
wherein $R^5$ is alkyl having 1 to 12 carbons, alkoxy having 1 to 12 carbons or alkenyl having 2 to 12 carbons.
11. The liquid crystal composition according to claim 9, wherein the fourth component is at least one compound selected from the group of compounds represented by formula (4-1) to formula (4-19):
(4-1) 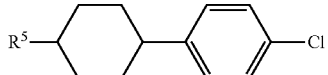
(4-2) 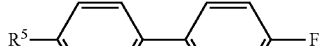
(4-3) 
(4-4) 
(4-5) 
(4-6) 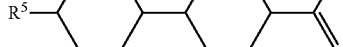

-continued (4-7) 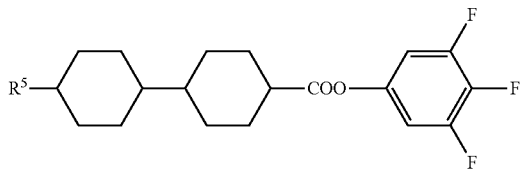

(4-8) 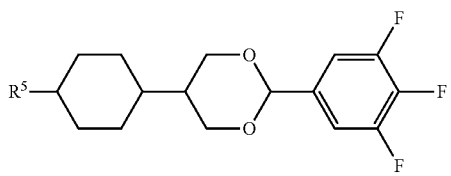

(4-9) 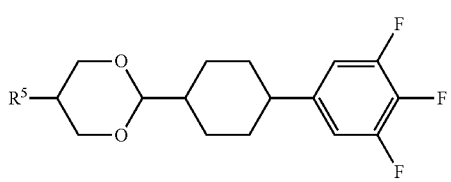

(4-10) 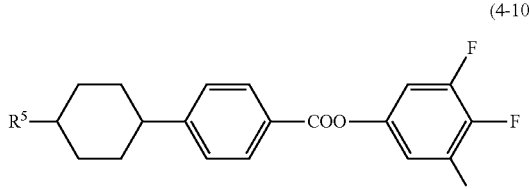

(4-11) 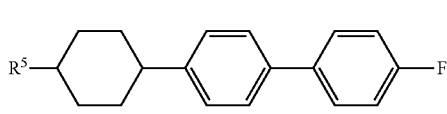

(4-12) 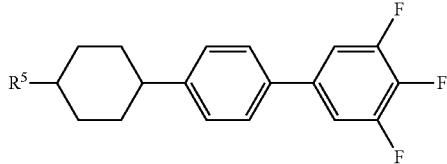

(4-13) 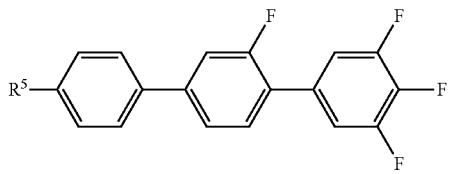

(4-14) 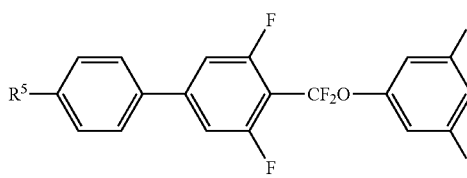

(4-15) 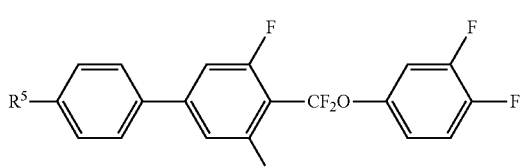

-continued (4-16) 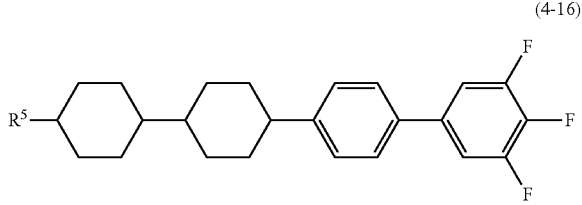

(4-17) 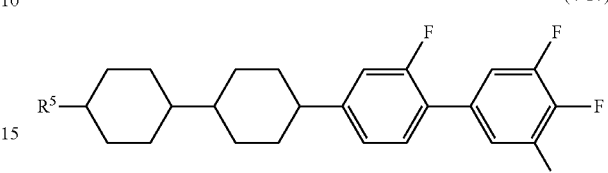

(4-18) 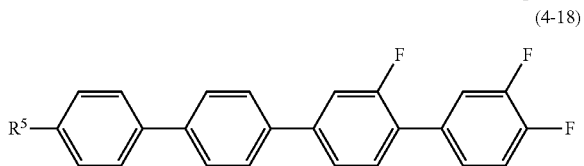

(4-19) 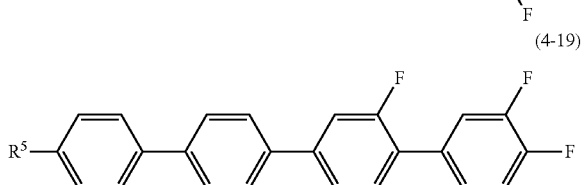

wherein $R^5$ is alkyl having 1 to 12 carbons, alkoxy having 1 to 12 carbons or alkenyl having 2 to 12 carbons.

12. The liquid crystal composition according to claim 8, wherein the ratio of the fourth component is in the range of approximately 3% by weight to approximately 40% by weight based on the total weight of the liquid crystal composition.

13. The liquid crystal composition according to claim 9, wherein the ratio of the fourth component is in the range of approximately 3% by weight to approximately 40% by weight based on the total weight of the liquid crystal composition.

14. The liquid crystal composition according to claim 8, further including at least one compound selected from the group of compounds represented by formula (5) as a fifth component:

(5) 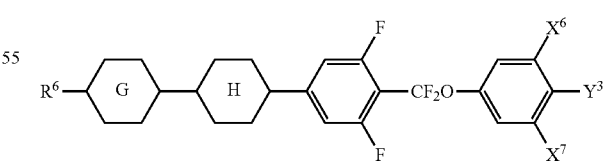

wherein $R^6$ is alkyl having 1 to 12 carbons, alkoxy having 1 to 12 carbons or alkenyl having 2 to 12 carbons; ring G and ring H are each independently 1,4-cyclohexylene, 1,4-phenylene, 2-fluoro-1,4-phenylene, 3-fluoro-1,4-phenylene, or 3,5-difluoro-1,4-phenylene; $X^6$ and $X^7$ are each independently hydrogen or fluorine; $Y^3$ is fluorine, chlorine or trifluoromethoxy.

15. The liquid crystal composition according to claim 9, further including at least one compound selected from the group of compounds represented by formula (5) as a fifth component:

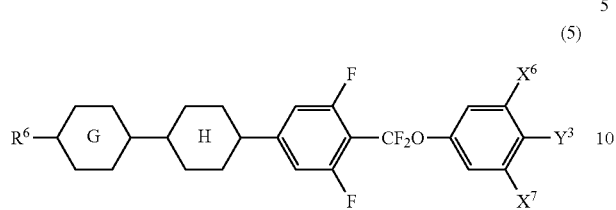
(5)

wherein $R^6$ is alkyl having 1 to 12 carbons, alkoxy having 1 to 12 carbons or alkenyl having 2 to 12 carbons; ring G and ring H are each independently 1,4-cyclohexylene, 1,4-phenylene, 2-fluoro-1,4-phenylene, 3-fluoro-1,4-phenylene, or 3,5-difluoro-1,4-phenylene; $X^6$ and $X^7$ are each independently hydrogen or fluorine; $Y^3$ is fluorine, chlorine or trifluoromethoxy.

16. The liquid crystal composition according to claim 14, wherein the fifth component is at least one compound selected from the group of compounds represented by formula (5-1) to formula (5-5):

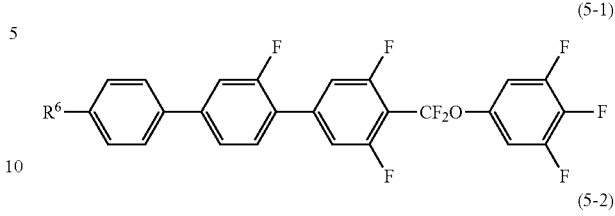
(5-1)

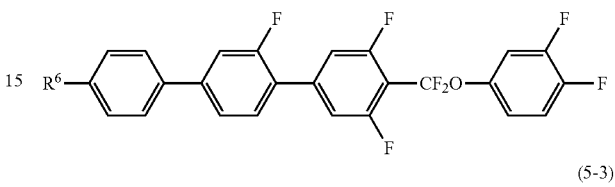
(5-2)

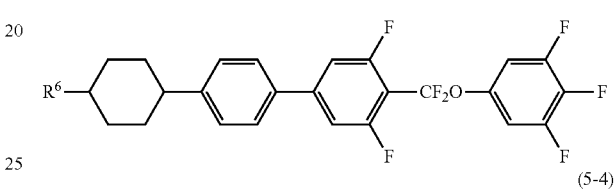
(5-3)

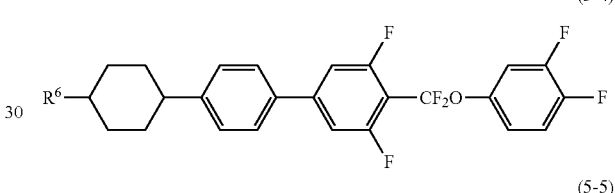
(5-4)

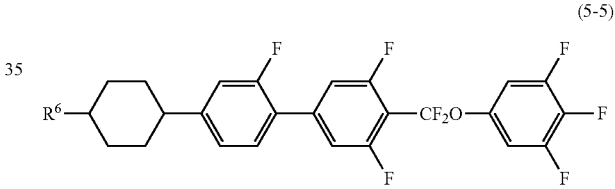
(5-5)

wherein $R^6$ is alkyl having 1 to 12 carbons, alkoxy having 1 to 12 carbons or alkenyl having 2 to 12 carbons.

17. The liquid crystal composition according to claim 15, wherein the fifth component is at least one compound selected from the group of compounds represented by formula (5-1) to formula (5-5):

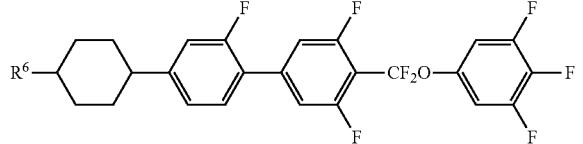

wherein $R^6$ is alkyl having 1 to 12 carbons, alkoxy having 1 to 12 carbons or alkenyl having 2 to 12 carbons.

18. The liquid crystal composition according to claim 14, wherein the ratio of the fifth component is in the range of approximately 3% by weight to approximately 20% by weight based on the total weight of the liquid crystal composition.

19. The liquid crystal composition according to claim 15, wherein the ratio of the fifth component is in the range of approximately 3% by weight to approximately 20% by weight based on the total weight of the liquid crystal composition.

20. The liquid crystal composition according to claim 1, wherein the maximum temperature of a nematic phase is approximately 70° C. or higher, the optical anisotropy (25° C.) at a wavelength of 589 nanometers is approximately 0.08 or more, and the dielectric anisotropy (25° C.) at a frequency of 1 kHz is approximately 4 or more.

21. A liquid crystal display device containing the liquid crystal composition according to claim 1.

22. The liquid crystal display device according to claim 21, wherein an operating mode of the liquid crystal display device is a TN mode, an OCB mode, an IPS mode, a FFS mode or a PSA mode, and a driving mode of the liquid crystal display device is an active matrix mode.

* * * * *